(12) United States Patent
Sprague et al.

(10) Patent No.: US 8,422,116 B2
(45) Date of Patent: Apr. 16, 2013

(54) COLOR DISPLAY DEVICES

(75) Inventors: Robert A. Sprague, Saratoga, CA (US); Craig Lin, San Jose, CA (US)

(73) Assignee: Sipix Imaging, Inc., Fremont, CA (US)

( * ) Notice: Subject to any disclaimer, the term of this patent is extended or adjusted under 35 U.S.C. 154(b) by 396 days.

(21) Appl. No.: 12/416,827

(22) Filed: Apr. 1, 2009

(65) Prior Publication Data
US 2009/0251763 A1 Oct. 8, 2009

Related U.S. Application Data

(60) Provisional application No. 61/042,180, filed on Apr. 3, 2008.

(51) Int. Cl.
G02B 26/00 (2006.01)
G09G 3/34 (2006.01)
(52) U.S. Cl.
USPC .......................................... 359/296; 345/107
(58) Field of Classification Search .................. 359/296; 345/107, 105; 430/32, 34, 38; 204/450, 204/600
See application file for complete search history.

(56) References Cited

U.S. PATENT DOCUMENTS

| | | | |
|---|---|---|---|
| 3,892,568 A | 7/1975 | Ota | |
| 4,298,448 A | 11/1981 | Muller et al. | |
| 5,378,574 A | 1/1995 | Winnik et al. | |
| 5,980,719 A | 11/1999 | Cherukuri et al. | |
| 6,198,809 B1 | 3/2001 | Disanto et al. | |
| 6,337,761 B1 | 1/2002 | Rogers et al. | |
| 6,373,461 B1 | 4/2002 | Hasegawa et al. | |
| 6,486,866 B1 | 11/2002 | Kuwahara et al. | |
| 6,538,801 B2 | 3/2003 | Jacobson et al. | |
| 6,693,620 B1 | 2/2004 | Herb et al. | |
| 6,704,133 B2 | 3/2004 | Gates et al. | |
| 6,724,521 B2 | 4/2004 | Nakao et al. | |
| 6,729,718 B2 | 5/2004 | Goto et al. | |
| 6,864,875 B2 | 3/2005 | Drzaic et al. | |
| 7,009,756 B2 | 3/2006 | Kishi et al. | |
| 7,038,655 B2 | 5/2006 | Herb et al. | |
| 7,038,670 B2 | 5/2006 | Liang et al. | |

(Continued)

FOREIGN PATENT DOCUMENTS

| | | |
|---|---|---|
| CN | 1617033 | 5/2005 |
| EP | 1 089 118 | 4/2001 |

(Continued)

OTHER PUBLICATIONS

U.S. Appl. No. 12/323,300, filed Nov. 25, 2008, Sprague et al.

(Continued)

*Primary Examiner* — Tuyen Tra
(74) *Attorney, Agent, or Firm* — Perkins Coie LLP.

(57) ABSTRACT

The present invention is directed to color display devices which are capable of displaying multiple color states. The display device comprises a plurality of display cells, wherein each of said display cells is (a) sandwiched between a first layer comprising a common electrode and a second layer comprising a plurality of driving electrodes, wherein at least one of the driving electrodes is a designated electrode, (b) filled with an electrophoretic fluid comprising at least two types of pigment particles dispersed in a solvent or solvent mixture, and (c) capable of displaying at least four color states. The display device may also comprise hiding layers or a brightness enhancement structure on the viewing side.

25 Claims, 33 Drawing Sheets

U.S. PATENT DOCUMENTS

| | | |
|---|---|---|
| 7,046,228 B2 | 5/2006 | Liang et al. |
| 7,050,218 B2 | 5/2006 | Kanbe |
| 7,075,502 B1 | 7/2006 | Drzaic et al. |
| 7,283,199 B2 | 10/2007 | Aichi et al. |
| 7,365,732 B2 | 4/2008 | Matsuda et al. |
| 7,417,787 B2 | 8/2008 | Chopra et al. |
| 7,545,557 B2 * | 6/2009 | Iftime et al. .......... 359/296 |
| 7,548,291 B2 * | 6/2009 | Lee et al. ............ 349/106 |
| 2002/0033792 A1 | 3/2002 | Inoue |
| 2002/0171620 A1 | 11/2002 | Gordon et al. |
| 2003/0002132 A1 | 1/2003 | Foucher et al. |
| 2003/0095094 A1 | 5/2003 | Goden |
| 2003/0107631 A1 | 6/2003 | Goto et al. |
| 2003/0132908 A1 | 7/2003 | Herb et al. |
| 2004/0051935 A1 | 3/2004 | Katase |
| 2004/0113884 A1 | 6/2004 | Albert et al. |
| 2004/0136048 A1 | 7/2004 | Arango et al. |
| 2004/0263947 A1 | 12/2004 | Drzaic et al. |
| 2005/0151709 A1 | 7/2005 | Jacobson et al. |
| 2005/0190431 A1 | 9/2005 | Matsuda |
| 2008/0042928 A1 | 2/2008 | Schlangen et al. |
| 2009/0034054 A1 | 2/2009 | Ikegami et al. |
| 2009/0213452 A1 | 8/2009 | Lin et al. |
| 2009/0273827 A1 | 11/2009 | Lin et al. |
| 2010/0053728 A1 | 3/2010 | Lin et al. |
| 2010/0165005 A1 | 7/2010 | Sprague |
| 2010/0165448 A1 | 7/2010 | Sprague |

FOREIGN PATENT DOCUMENTS

| | | |
|---|---|---|
| WO | WO 99/53373 | 10/1999 |
| WO | WO 03/016993 | 2/2003 |
| WO | WO 2007/013682 | 2/2007 |
| WO | WO 2008-122927 | 10/2008 |
| WO | WO 2009/105385 | 8/2009 |
| WO | WO 2009/134889 | 11/2009 |
| WO | WO 2010/027810 | 3/2010 |

OTHER PUBLICATIONS

U.S. Appl. No. 12/323,315, filed Nov. 25, 2008, Sprague et al.
U.S. Appl. No. 12/370,485, filed Feb. 12, 2009, Lin et al.
U.S. Appl. No. 12/397,917, filed Mar. 4, 2009, Lin.
International Search Report for PCT/US09/39193, mailed May 12, 2009.
U.S. Appl. No. 13/038,255, filed Mar. 1, 2011, Sprague.
U.S. Appl. No. 13/092,052, filed Apr. 21, 2011, Sprague et al.

* cited by examiner

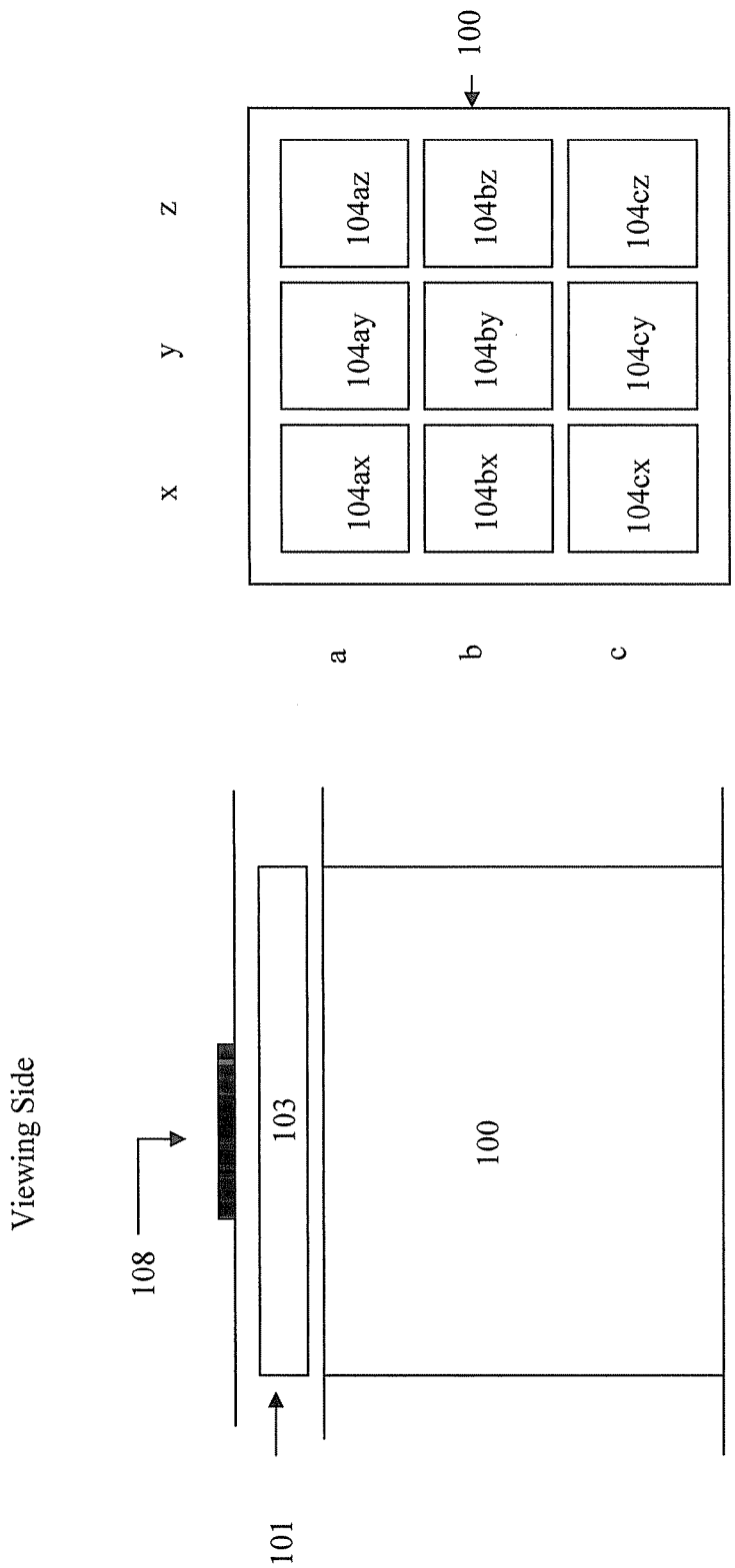

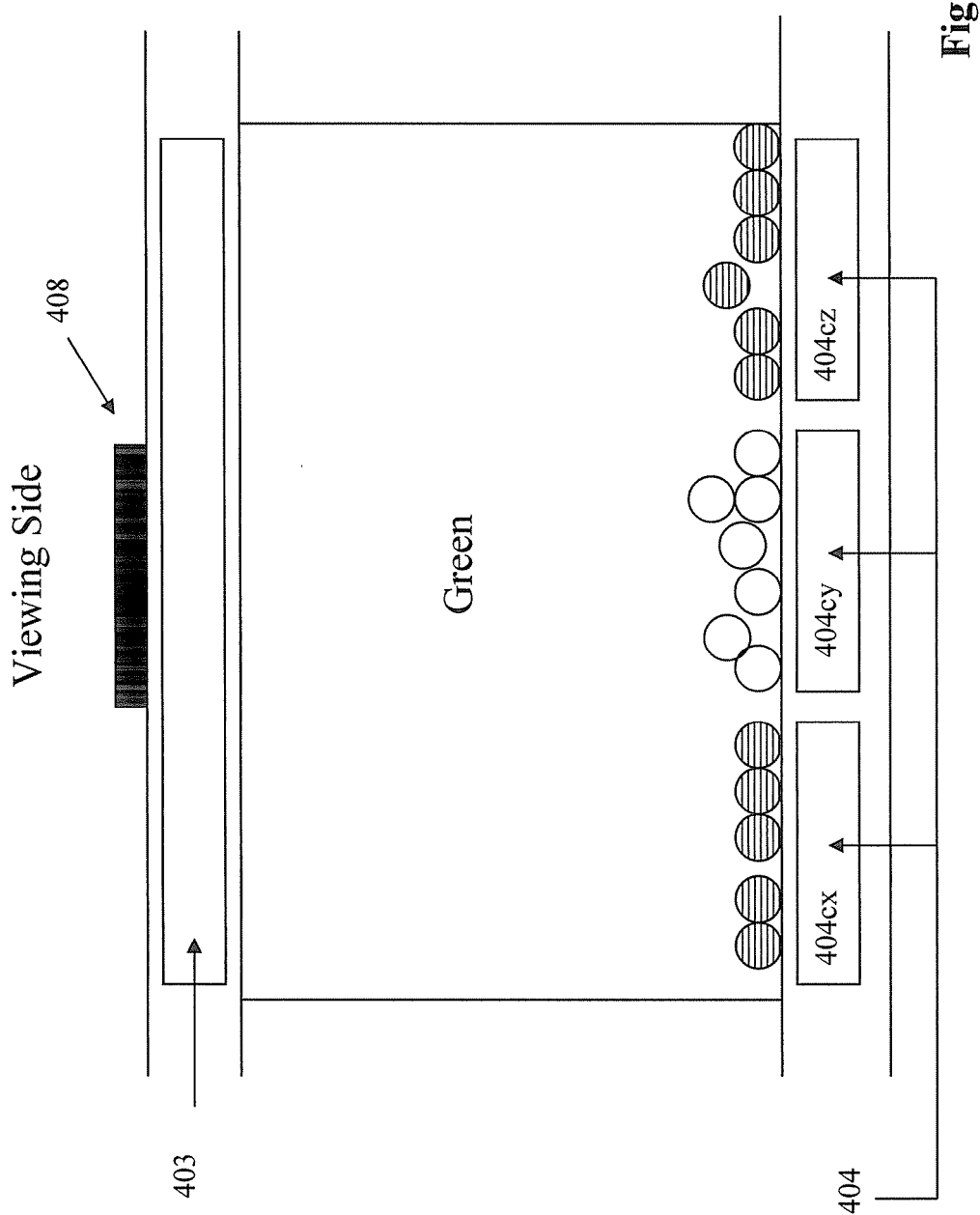

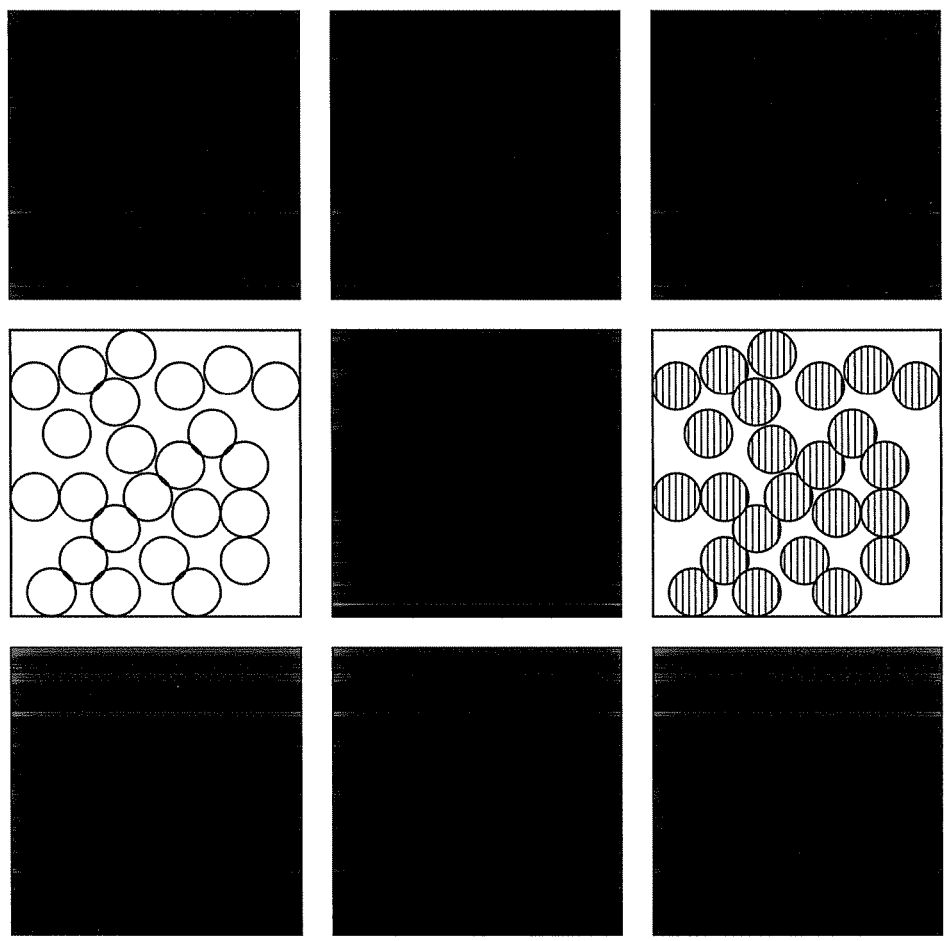

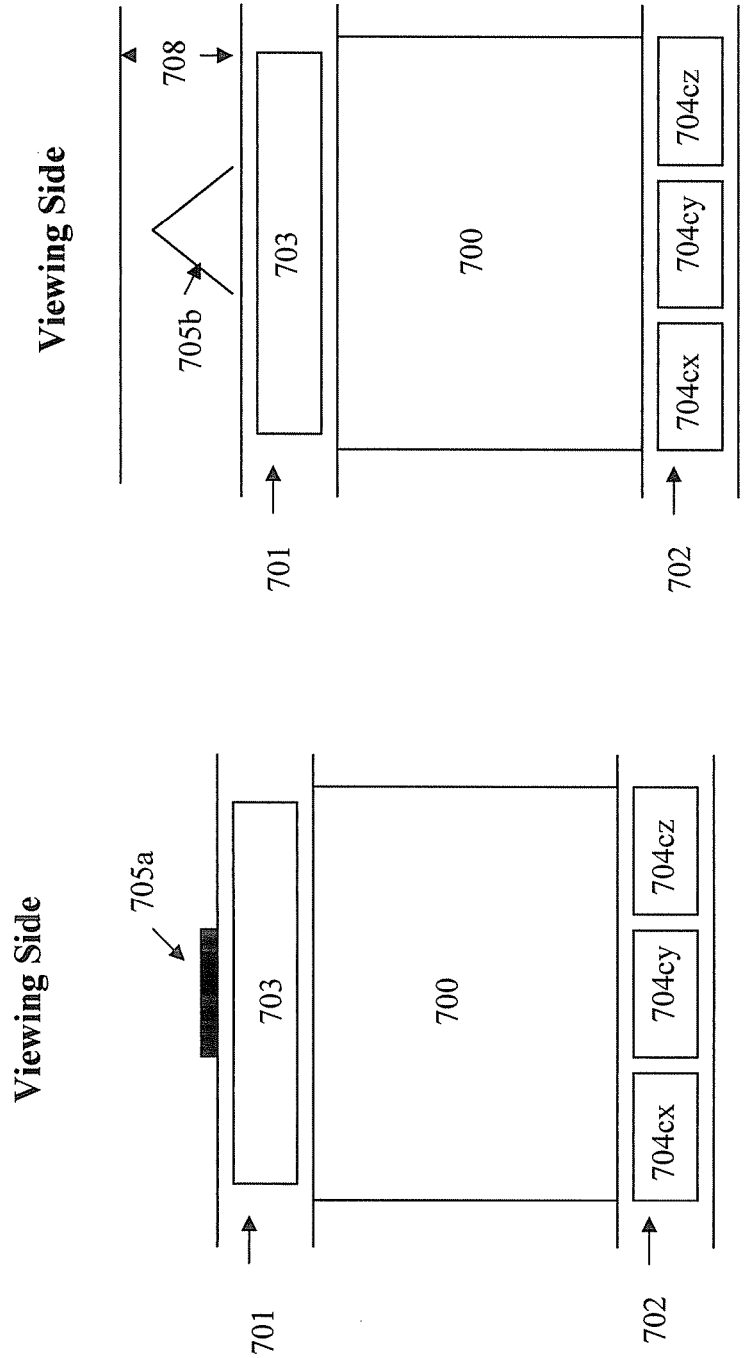

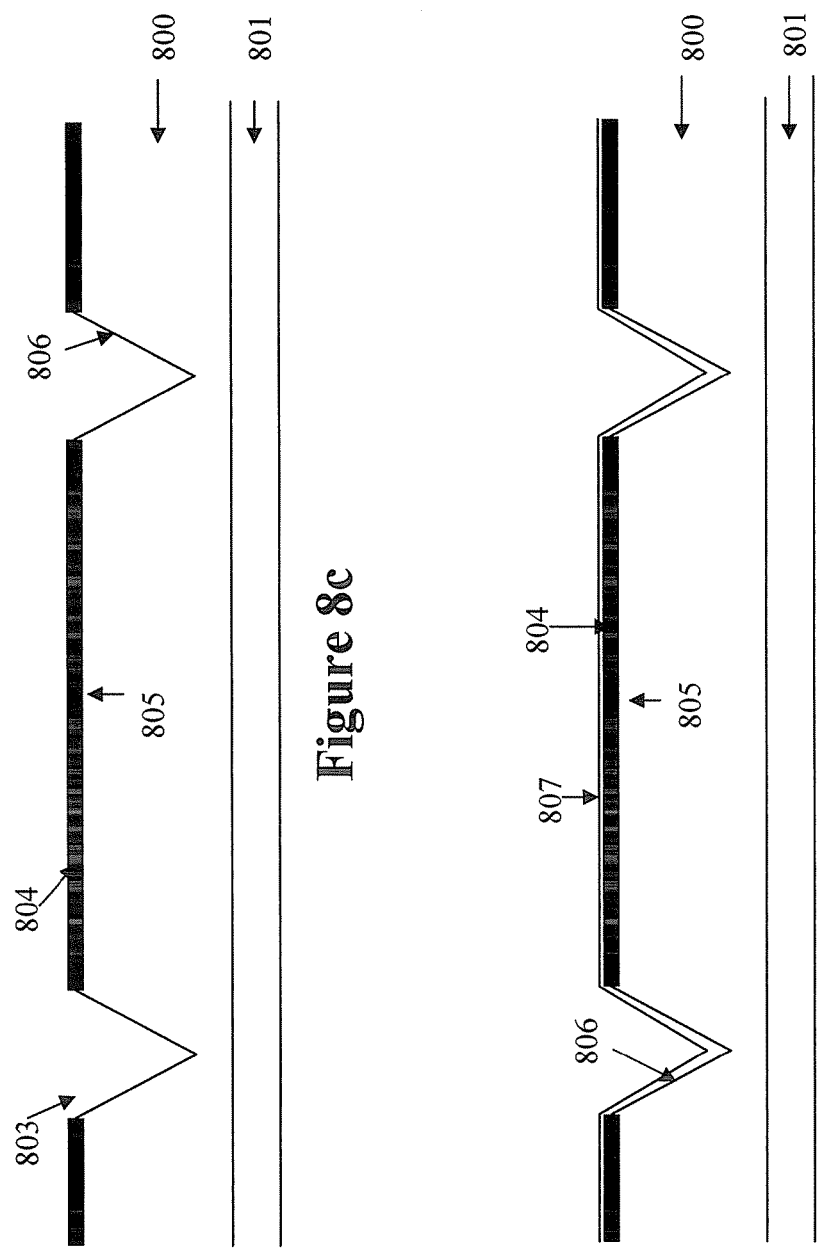

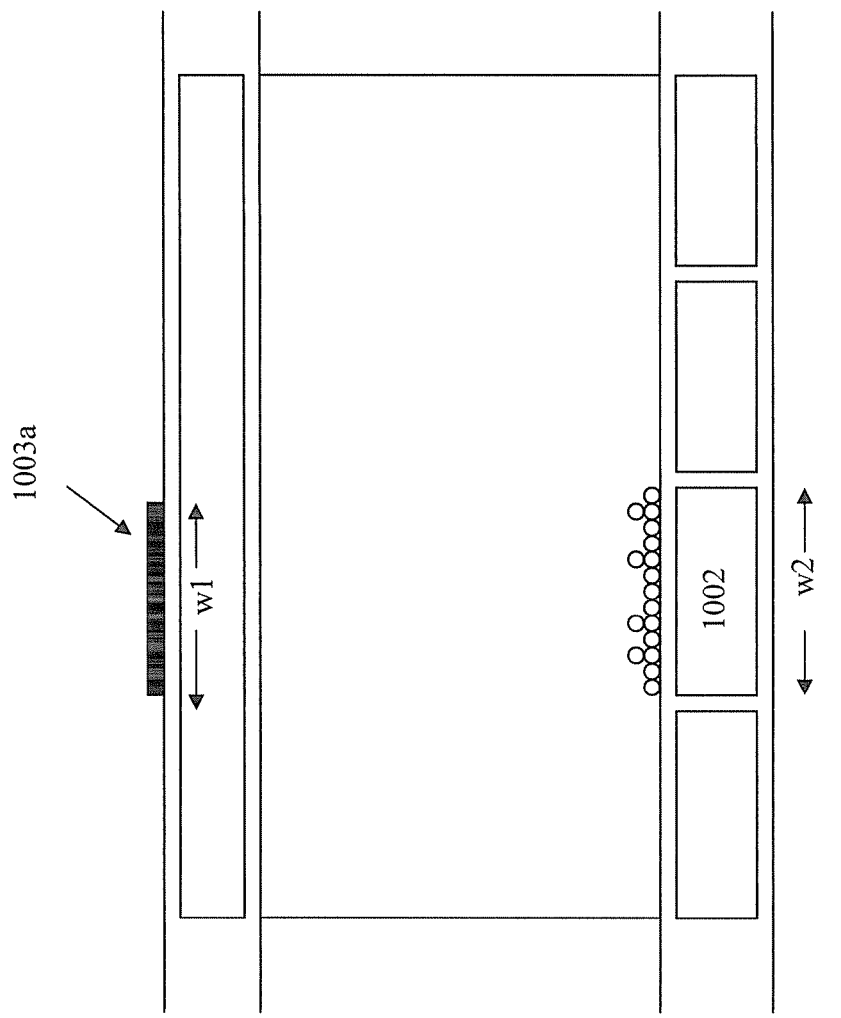

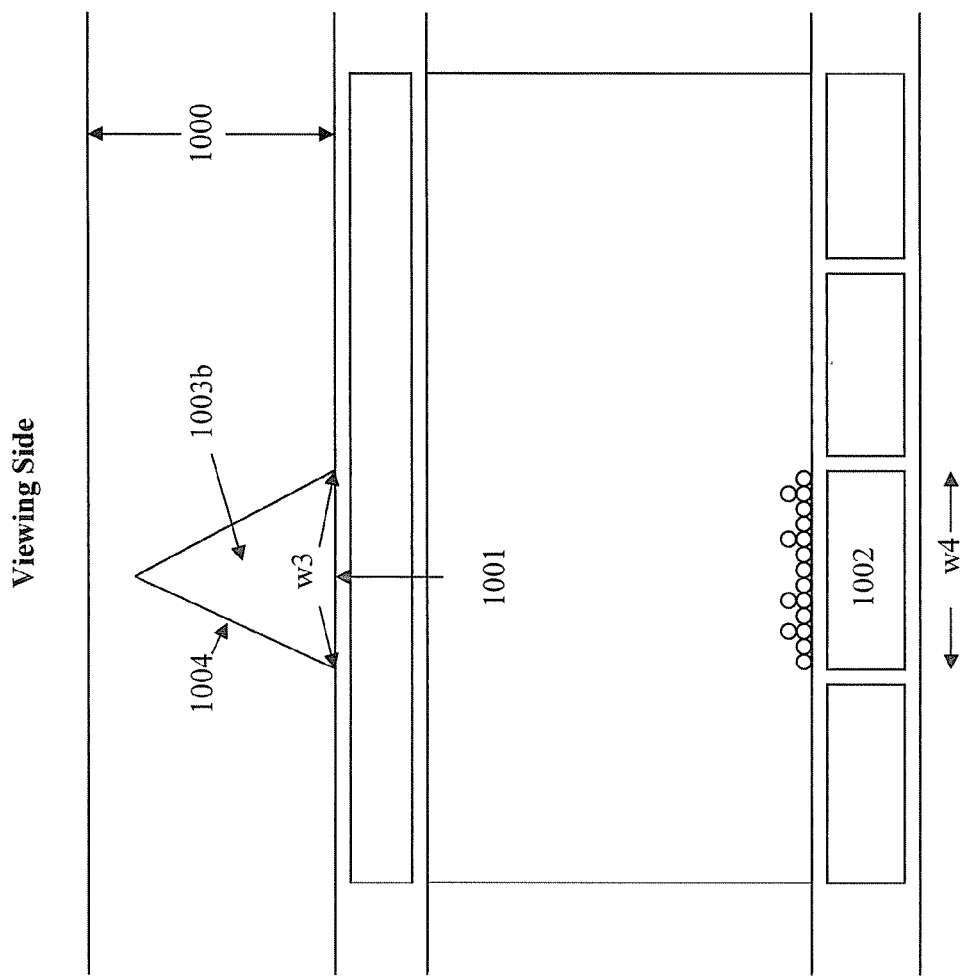

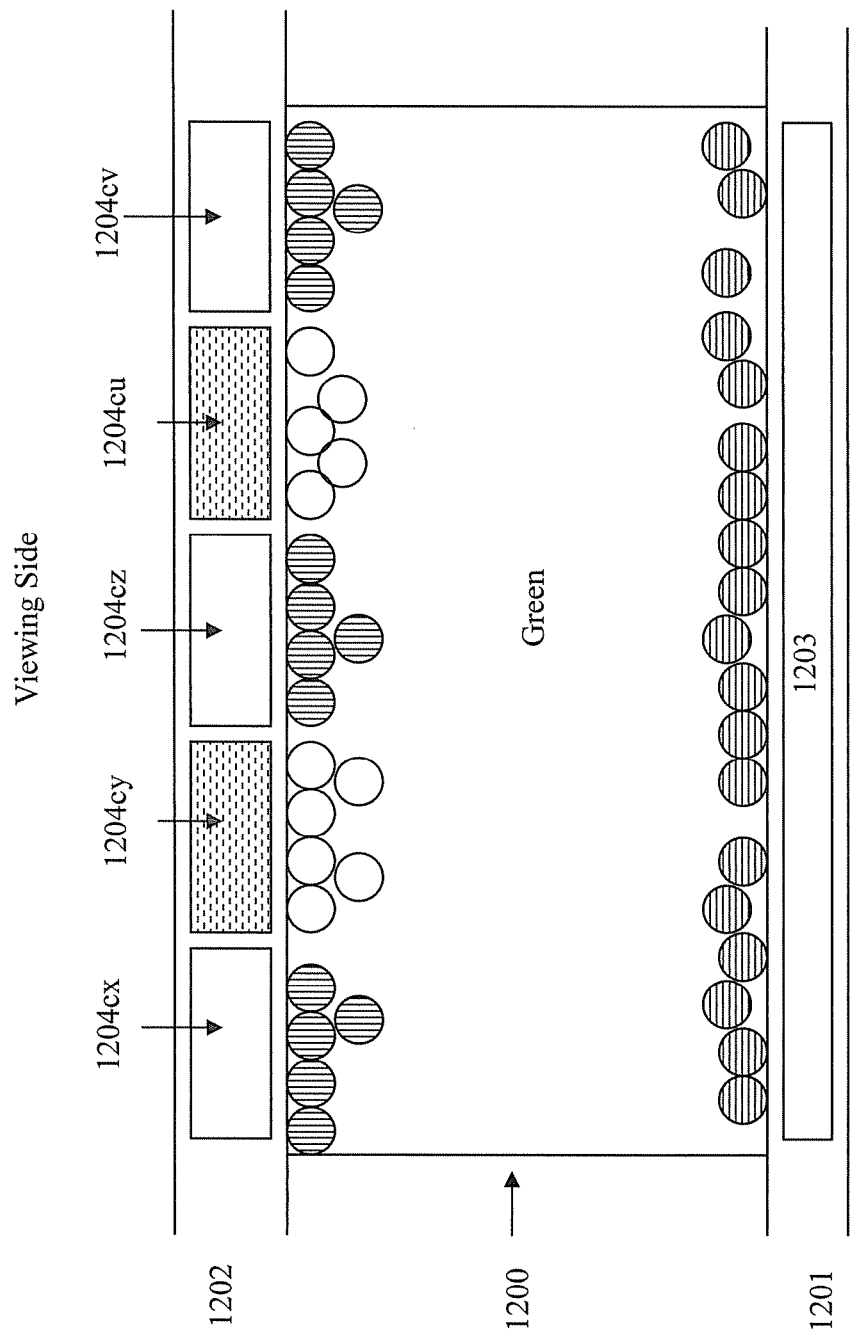

COLOR DISPLAY DEVICES

This application claims priority to U.S. Provisional Application No. 61/042,180, filed Apr. 3, 2008; the content of which is incorporated herein by reference in its entirety.

FIELD OF THE INVENTION

The present invention is directed to display devices in which each display cell is capable of displaying multiple color states. The display device may also comprise blocking layers such as black matrix layers or a brightness enhancement structure on the viewing side.

BACKGROUND OF THE INVENTION

Prior technologies relating to reflective color displays have, in general, used red/green/blue (RGB) colors. In the RGB color displays, each pixel is broken down into three or four sub-pixels and each sub-pixel has a red filter, blue filter, green filter or no filter over a black and white reflective medium. By selectively turning sub-pixels on or off, a full color spectrum may be achieved. For example, the white state is achieved by turning on all three RGB sub-pixels. Because each of the RGB sub-pixels occupies ⅓ of the white spectrum, the maximum reflectivity of each sub-pixel is about ⅓ of the reflectivity of the white color. The maximum brightness of each of the RGB colors therefore is ⅓ of the white color since the sub-pixels of the other two colors are turned off. In practice, a reflective display actually achieves substantially less than this theoretical brightness.

Over the years, many pixel architectures have evolved, including adding two green sub-pixels or a white sub-pixel to gain some brightness at the expense of color saturation. However, in general, the RGB color system shows very limited whiteness and poor color brightness.

U.S. Pat. No. 7,046,228 discloses an electrophoretic display device having a dual switching mode which allows the charged pigment particles in a display cell to move in either the vertical (up/down) direction or the planar (left/right) direction. U.S. patent application Ser. No. 12/370,485 discloses an alternative multiple color display. In both cases, display cells are filled with a dyed fluid having white particles dispersed therein and each of the display cells is capable of displaying three color states, i.e., the color of the charged pigment particles, the color of the dielectric solvent or solvent mixture or the background color of the display cell. These two types of the display can provide RGB color states which are as bright as those achieved by the RGB type display. They, in addition, can also provide non-compromised white and black color states which could not be achieved by the RGB type display.

SUMMARY OF THE INVENTION

The present invention is directed to further alternative designs of color display devices. The color display of the present invention allows each display cell to display at least four different color states, which enables a significant increase in color brightness (from 50% to more than 3 times in color brightness compared to the RGB type display), while maintaining the non-compromised black and white color states.

The first aspect of the invention is directed to a display device which comprises a plurality of display cells, wherein each of said display cells is (a) sandwiched between a first layer comprising a common electrode and a second layer comprising a plurality of driving electrodes, wherein at least one of the driving electrodes is the designated electrode, (b) filled with an electrophoretic fluid comprising at least two types of pigment particles dispersed in a solvent or solvent mixture, and (c) capable of displaying at least four color states.

The display device may further comprise blocking layers which are on the viewing side of the display device and are positioned corresponding to the designated electrode(s) in order to hide the pigment particles which gather at the designated electrode(s). The blocking layer may be a black matrix layer or a micro-structure or micro-reflector of a brightness enhancement structure.

In one embodiment, the electrophoretic fluid comprises two types of pigment particles dispersed in a solvent or solvent mixture. The two types of pigment particles may carry opposite charge polarities or carry the same charge polarities but are of different electrophoretic mobilities. In the two types of pigment particles, one may be white and the other may be red, green or blue. The solvent or solvent mixture in the electrophoretic fluid may be red, green or blue.

In another embodiment, the electrophoretic fluid comprises three types of pigment particles dispersed in a solvent or solvent mixture. The three types of pigment particles may carry different charge polarities or different levels of the same charge polarity. In the three types of pigment particles, one may be white and the other two may be red and green, red and blue or green and blue. The solvent or solvent mixture in the electrophoretic fluid may be red, green or blue.

In a further embodiment, the driving electrodes are not aligned with the boundary of the display cell.

In yet a further embodiment, the pigment particles are driven to the designated electrode(s) all at once. Alternatively, the pigment particles are driven to the designated electrode(s) in steps.

In yet a further embodiment, the driving electrodes on the second layer are a grid of at least 2×2.

In yet a further embodiment, the first layer is on the viewing side. Alternatively, the second layer is on the viewing side.

In yet a further embodiment, the designated electrodes are not transparent. For example, they may be opaque.

In yet a further embodiment, each pixel in the display device may have two, three or four sub-pixels.

BRIEF DISCUSSION OF THE DRAWINGS

FIG. 1a depicts a cross-section view of a display cell of a color display device of the present invention.

FIG. 1b depicts a top view of the layer comprising driving electrodes.

FIGS. 4a-4e illustrate how four different color states may be displayed.

FIG. 7a depicts a color display of the present invention with black matrix layers on the viewing side of the display.

FIG. 7b depicts a color display of the present invention with a brightness enhancement structure on the viewing side of the display.

FIGS. 8a-8g show examples of how a brightness enhancement structure may be fabricated.

FIGS. 10a and 10b show how the black matrix layers and the micro-structure or micro-reflector are aligned with designated electrodes, respectively.

FIGS. 12a-12e depict a further alternative design of color display devices of the present invention.

DETAILED DESCRIPTION OF THE INVENTION

I. Configuration of a Display Device

Figure 1C:
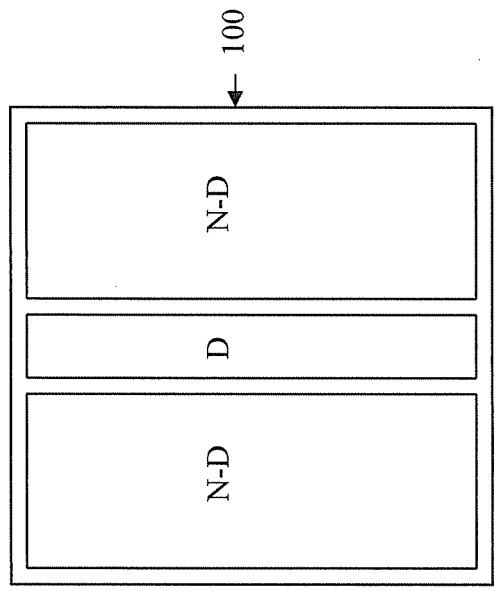
FIGS. 1c and 1d depict alternative designs of the layer comprising driving electrodes.

FIG. 1a depicts a cross-section view of a display cell of a color display device of the present invention. The display cell (100) is sandwiched between a first layer (101) and a second layer (102). The first layer comprises a common electrode (103). The second layer comprises more than one driving electrode (104ax, 104ay, 104az, 104bx, 104by, 104bz, 104cx, 104cy and 104cz). However, in the cross-section view, only the driving electrodes 104cx, 104cy and 104cz are shown.

In one embodiment, each display cell, as shown in FIG. 1a, represents a single sub-pixel or pixel.

FIG. 1b depicts the top view of the layer comprising driving electrodes of the display cell of FIG. 1a. As shown, the second layer (102) comprises 3×3 driving electrodes, denoted as 104ax, 104ay, 104az, 104bx, 104by, 104bz, 104cx, 104cy and 104cz. While only a 3×3 grid is shown, the second layer may comprise any grid which is at least 2×2. The size of the driving electrodes may vary, depending on the size of the display cell. There is a gap between the driving electrodes. In other words, the driving electrodes are not in contact with each other.

In the context of the present invention, the driving electrode(s) intended for the charged pigment particles to gather in order to be hidden from the viewer is/are referred to as the "designated electrode(s)".

In FIGS. 1a and 1b, if driving electrode 104cy is the designated electrode, then there is a blocking layer (108) on top of the display cell on the viewing side in a position corresponding to the designated electrode 104cy, so that any particles gather at the designated electrode (104cy) will be hidden from the viewer.

The multiple driving electrodes within a display cell allow the particles to migrate to one or more designated electrodes or to spread over all the driving electrodes.

The 9 driving electrodes in FIG. 1b are shown to have the same shape and size. It is understood that the shapes and sizes of the driving electrodes in the same display device may vary, as long as they serve the desired functions.

Optionally, there is a background layer (not shown), which may be above the second layer (102) or below the second layer (102). Alternatively, the second layer may serve as a background layer. The background layer preferably is black.

The common electrode (103) is usually a transparent electrode layer (e.g., ITO), spreading over the entire top of the display device. The driving electrodes (104s) may be active matrix electrodes which are described in U.S. Pat. No. 7,046, 228, the content of which is incorporated herein by reference in its entirety. It is noted that the scope of the present invention is not limited to the driving electrodes being active matrix electrodes. The scope of the present application encompasses other types of electrode addressing as long as the electrodes serve the desired functions.

It is also shown in FIG. 1b that the 9 driving electrodes are aligned with the boundary of the display cell (100). However, for this type of color display, this feature is optional. Details of an un-aligned configuration are given below.

While the first layer (101) is shown in FIG. 1a as the viewing side, it is also possible for the second layer (102) to be on the viewing side. This is illustrated as alternative designs discussed in Section VI below.

The display cells are filled with an electrophoretic fluid which comprises at least two types of pigment particles dispersed in a solvent or solvent mixture. The different types of pigment particles may carry charges of opposite polarity.

It is also possible to have two types of pigment particles carrying the same charge polarity but with different electrophoretic mobilities, if the mobility of one pigment is substantially different from that of the other. The mobilities of the pigment particles may arise from different particle sizes, particle charges or particle shapes. Coating or chemical treatment of the surfaces of the pigment particles can also be used to adjust the electrophoretic mobility of the pigment particles.

Figure 1D:
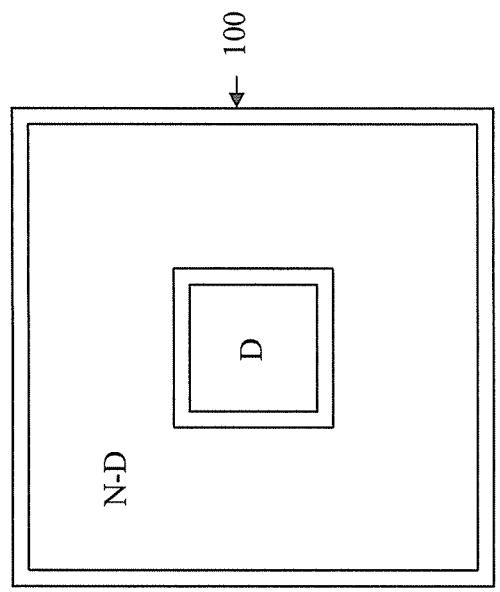

Alternative designs of the second layer (102) are shown in FIGS. 1c and 1d. In FIG. 1c, the center electrode "D" is the designated electrode whereas the non-designated driving electrode "N-D" surrounds the designated electrode D. In FIG. 1d, a designated electrode (D) is sandwiched between two non-designated electrodes (N-D). These alternative designs have the advantage that there are fewer addressing points that are needed, thus reducing the complexity of the electrical circuit design. It is also noted that there may be different numbers of the designated and non-designated electrodes and the designated and non-designated electrodes may be of any shapes; but the non-designated electrode(s) must be larger in total area than the designated electrode(s).

For the alternative designs as shown, the designated electrode(s) and the non-designated electrode(s) must be aligned with the boundary of the display cell.

Figure 2:
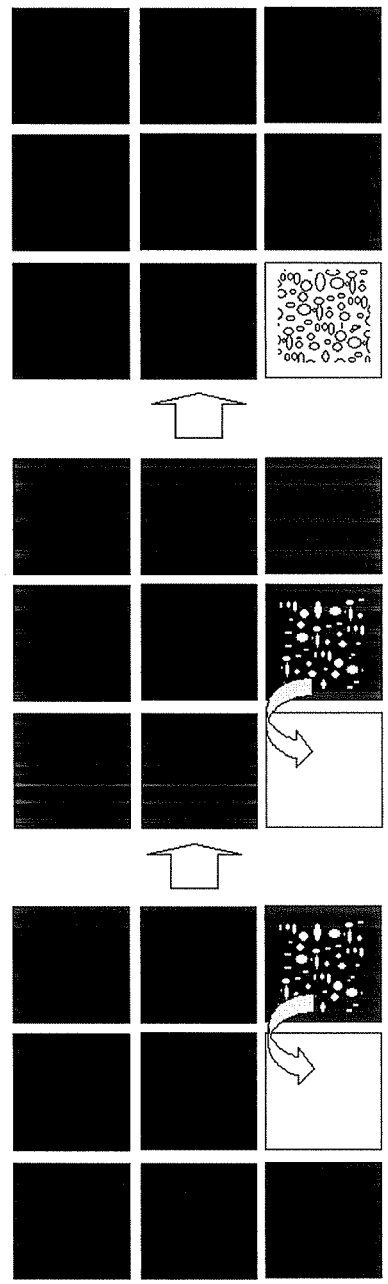
FIG. 2 illustrates how the charged pigment particles may move to the designated electrodes in steps.

In the context of the present invention, the migration of the charged pigment particles to the designated electrode(s) may occur all at once, that is, the voltages of the common and driving electrodes are set at such to cause the charged pigment particles to migrate to be at or near the designated electrode(s) all at once. Alternatively, the migration may take place in steps. As shown in FIG. 2, the voltages of driving electrodes are set at such to cause the charged pigment particles to move from one driving electrode to an adjacent driving electrode one step at a time and eventually to the designated electrode(s). This driving method may prevent the charged pigment particles from being trapped at the center of one large driving electrode even though the large driving electrode has the same polarity as the pigment particles.

Figure 3:
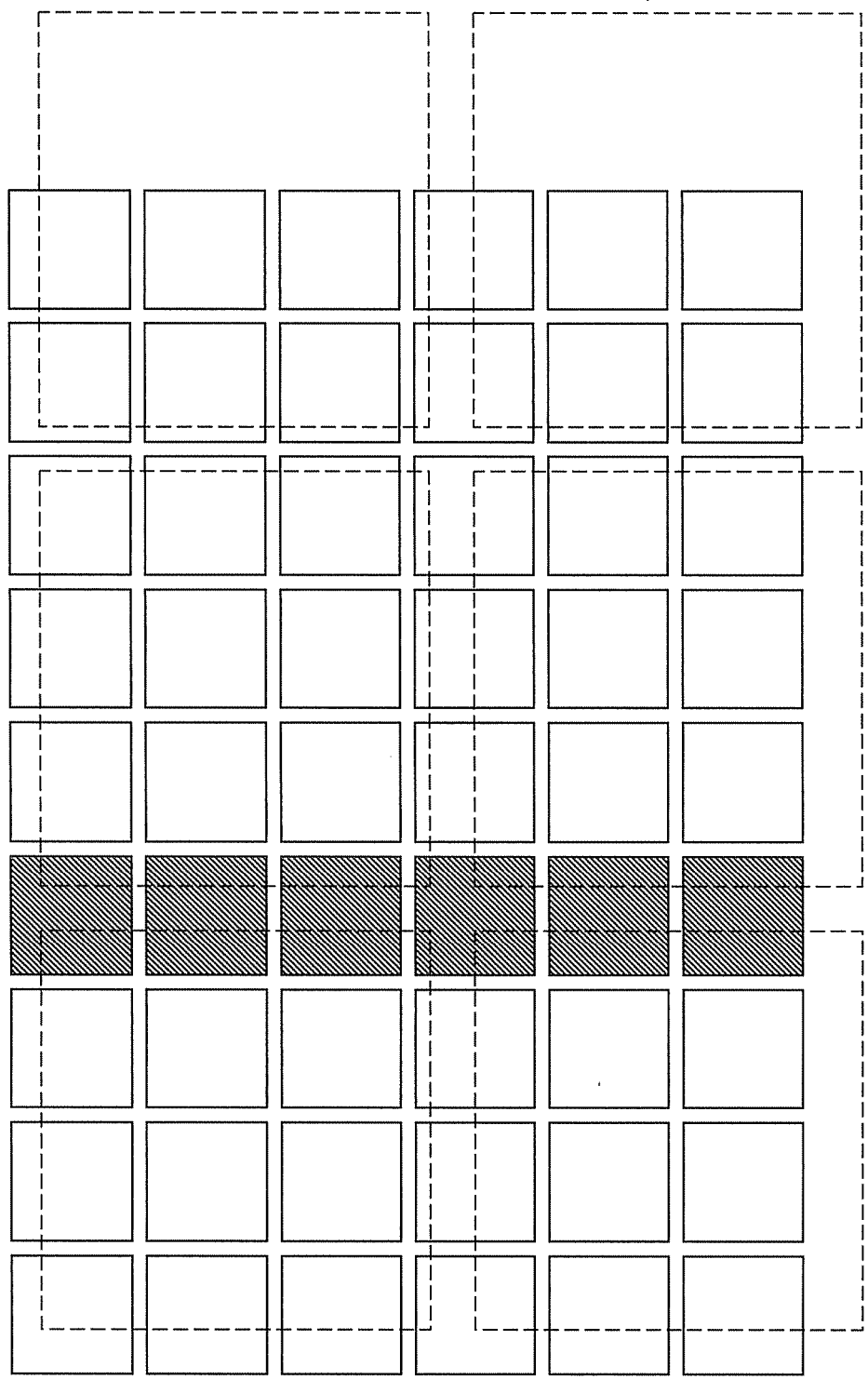
FIG. 3 depicts the driving electrodes not aligned with the boundaries of the display cells.

Another one of the advantages of the color display of the present invention is that the driving electrodes do not have to be aligned with the boundary of the display cell. As shown in FIG. 3, the display cells (represented by the dotted lines) and the driving electrodes (represented by the solid lines) are not aligned. In this case, the charged pigment particles may still be driven to show the desired color states. To accomplish this, a scanning method or similar approaches may be used to first determine which driving electrodes address which display cell. Those driving electrodes (shaded in FIG. 3) at the edges of the display cells may never be used or may be used to drive only partial areas of the driving electrodes. However, in the latter case, cross-talk may occur.

II. Two Types of Particle System

FIGS. 4a-4d illustrate an example of how different color states may be displayed. There are two types of pigment particles in the electrophoretic fluid filled in the display cell. The two types of pigment particles are of the white and blue colors respectively, and they move independently from each other because they carry charges of opposite polarities. It is assumed that the white pigment particles are negatively charged and the blue pigment particles are positively charged. It is also assumed that the two types of pigment particles are dispersed in a solvent of green color.

While only three driving electrodes are shown, it is understood that there may be more driving electrodes and in any case, it is assumed that only driving electrode 404cy is the designated electrode.

Figure 4A:
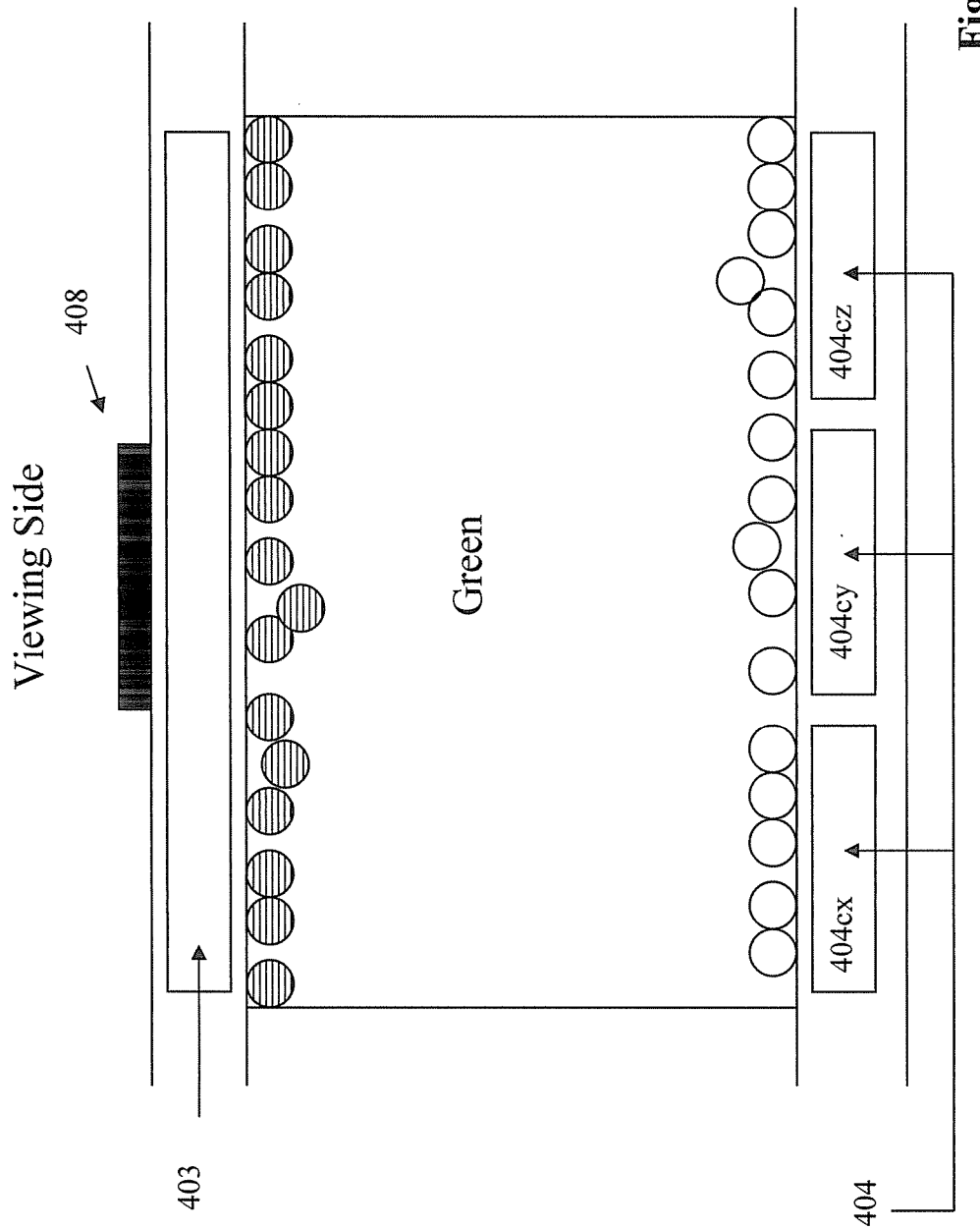

When a negative voltage potential is imposed on the common electrode (403) and a positive voltage potential is imposed on the driving electrodes (404), the positively charged blue particles are drawn to the common electrode (403) and the negatively charged white particles to the driving electrodes (404). As a result, a blue color is seen at the viewing side, as shown in FIG. 4a.

Figure 4B:
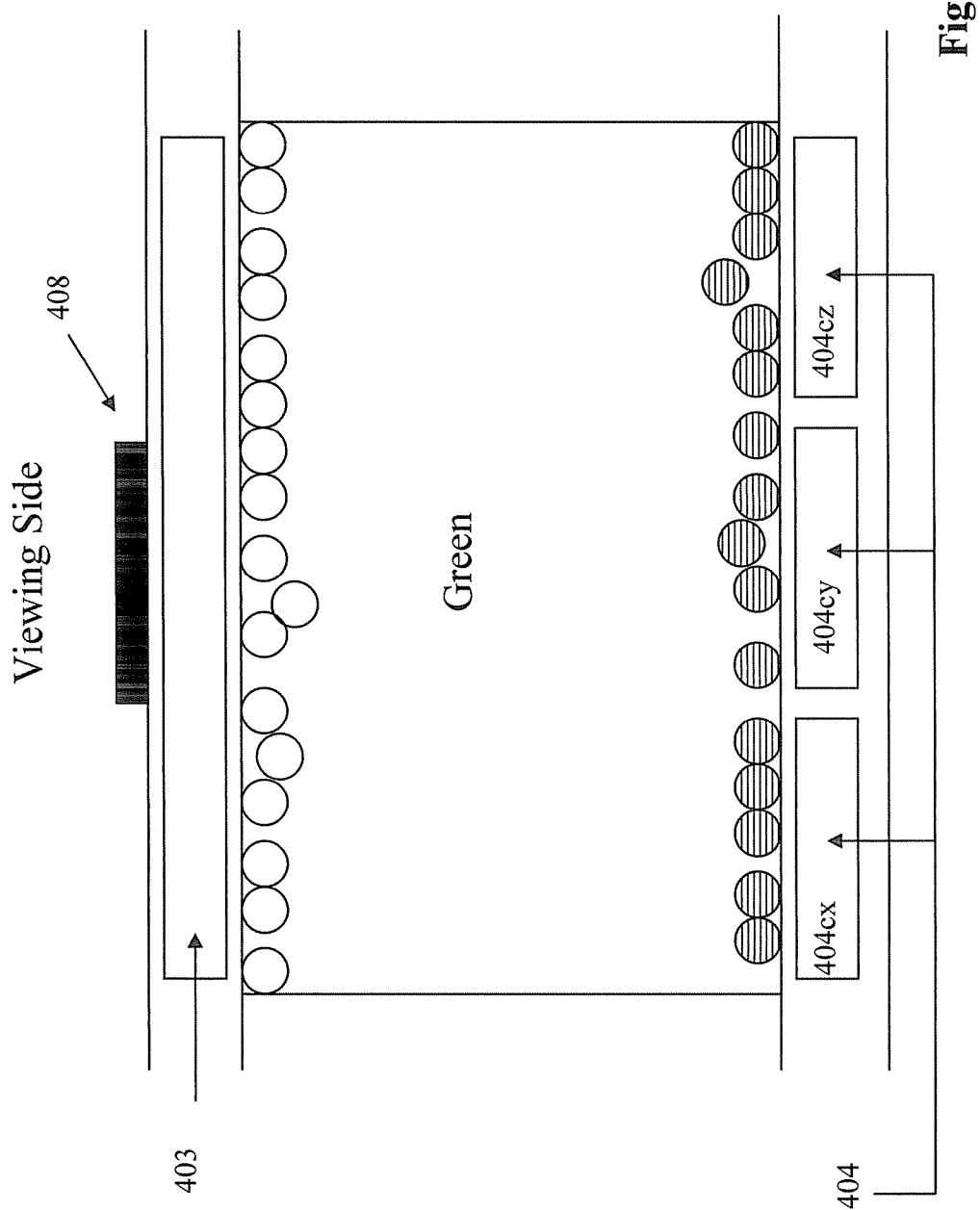

In FIG. 4b, when a negative voltage potential is imposed on the driving electrodes (404) and a positive voltage potential is imposed on the common electrode (403), the positively charged blue particles are drawn to the driving electrodes (404) and the negatively charged white particles to the common electrode (403). As a result, a white color is seen at the viewing side.

FIG. 4c shows a scenario in which a positive voltage potential is imposed on the designated electrode (404cy) and a negative voltage potential is imposed on the non-designated driving electrodes (404cx and 404cz). The common electrode (403) is held at ground. In this case, the negatively charged white particles are moved to be at or near the designated electrode (404cy) which is hidden from the viewer by the blocking layer (408) and the positively charged blue particles are on the non-designated driving electrodes visible from the viewing side. The blue particles reflect the incoming light with only the spectrum of the blue color. Since the green color of the solvent does not transmit a significant amount of the blue light, a black color is perceived and seen from the viewing side.

While only one driving electrode (404cy) is shown to be a designed electrode, in practice, the number of such designated electrodes may be more than one. In other words, there may be one or more such designated electrodes. The one designated electrode or multiple designated electrodes may be any of the driving electrodes, location wise.

In the context of the present invention, the driving electrode(s) intended for the charged pigment particles to gather in order to be hidden from the viewer is/are referred to as the "designated electrode(s)" and the driving electrodes not intended for the charged pigment particles to be hidden from the viewer are referred to as the "non-designated electrodes". For a designated electrode, there is a blocking layer on top of the display cell on the viewing side in a position corresponding to the designated electrode, so that the particles gather at the designated electrode are hidden from the viewing side.

FIG. 4d (a top view) illustrates an alternative way of achieving the black color state. The driving electrodes may appear in black if there is a black background layer above or below the second layer. Alternatively, the driving electrodes may appear in black if the second layer itself is black. A black background layer on the driving electrodes may provide an alternative black color state as shown in FIG. 4d. In this case, there are two designated electrodes. The white pigment particles gather at one of the designated electrodes whereas the blue pigment particles gather at another designated electrode. The blue and white particles are hidden from the viewer by blocking layers. There are substantially no pigment particles gathering at the non-designated electrodes. Usually a layer of the black color can absorb more light than the combination of the fluid and particles. As a result, a high quality black state is seen from the viewing side.

In the alternative approach as shown in FIG. 4d, there may be blocking layers to hide both the blue and white particles, as illustrated. However the blocking layer for the blue particles in fact is optional. In other words, only the blocking layer is always needed to hide the white particles.

Figure 4E:
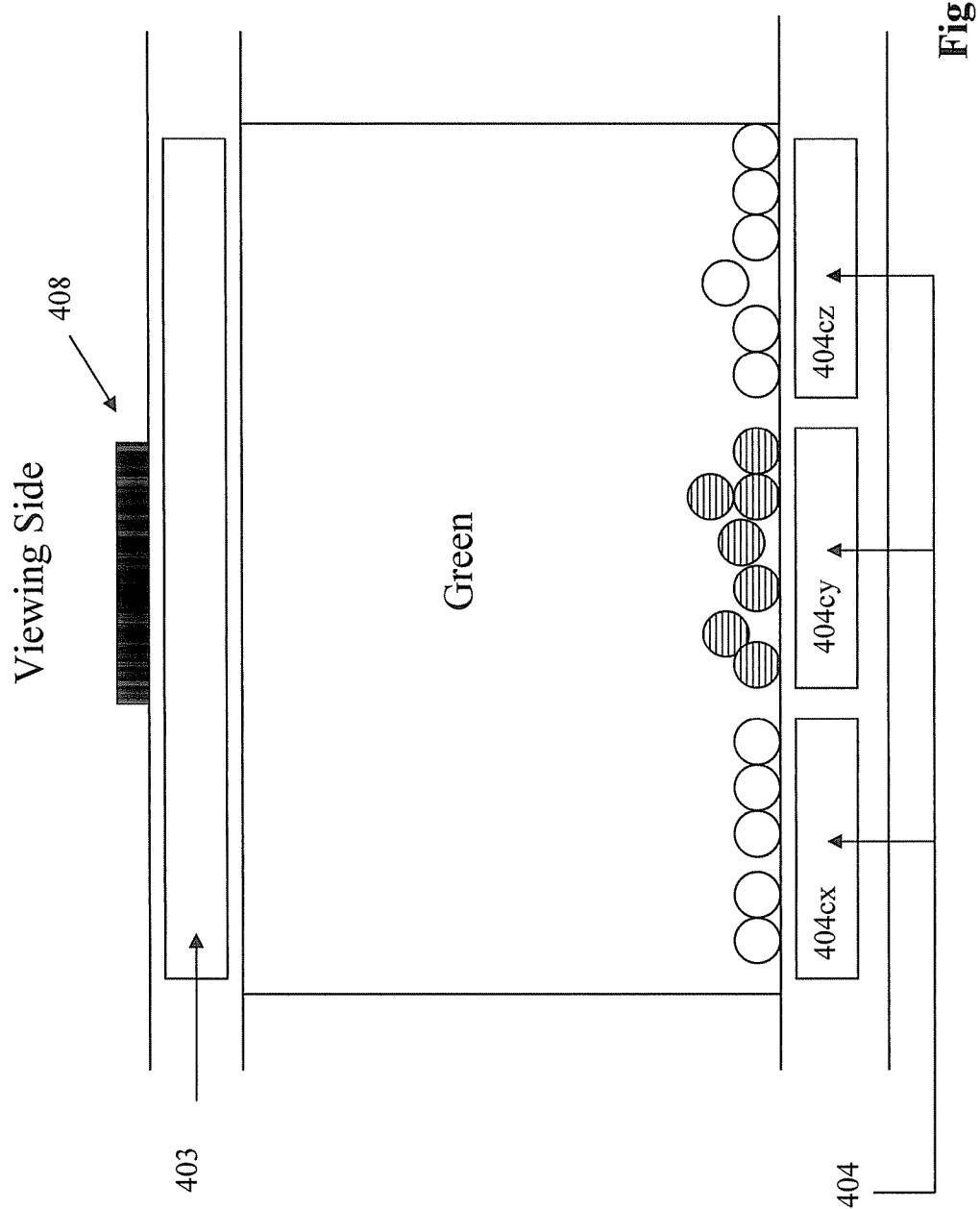

FIG. 4e shows another scenario in which a positive voltage potential is imposed on the non-designated driving electrodes (404cx and 404cz) and a negative voltage potential is imposed on the designated electrode (404cy). The common electrode (403) is held at ground. In this case, the negatively charged white particles move to be at or near the non-designated driving electrodes and act as a reflector. The color state of the display cell, seen from the viewing side is green.

The two types of particle system as shown in FIGS. 4a-4e can be implemented with a solvent of any one of the primary colors and pigment particles of any other primary colors. Options may also exist for transparent subtractive color particles and solvents.

The two types of particles system can display four color states in a single sub-pixel, namely, white, black, green and blue, as shown in FIGS. 4a-4e.

III. Three Types of Particle System

FIGS. 5a-5e illustrate another example of how different color states may be displayed, according to the present invention. There are three types of pigment particles in the electrophoretic fluid filled in the display cell. For illustration purpose, the three types of pigment particles are of the red, white and blue colors respectively, and they move independently from each other because they carry different levels of charge polarities. It is assumed that the white particles are positively charged, while the blue particles carry a weaker negative polarity and red particles carry a stronger negative polarity. It is also assumed that the three types of pigment particles are dispersed in a solvent of green color.

While only five driving electrodes are shown, it is understood that there may be more driving electrodes and in any case, it is assumed that only driving electrodes 504cy and 504cu are the designated electrodes.

Figure 5A:
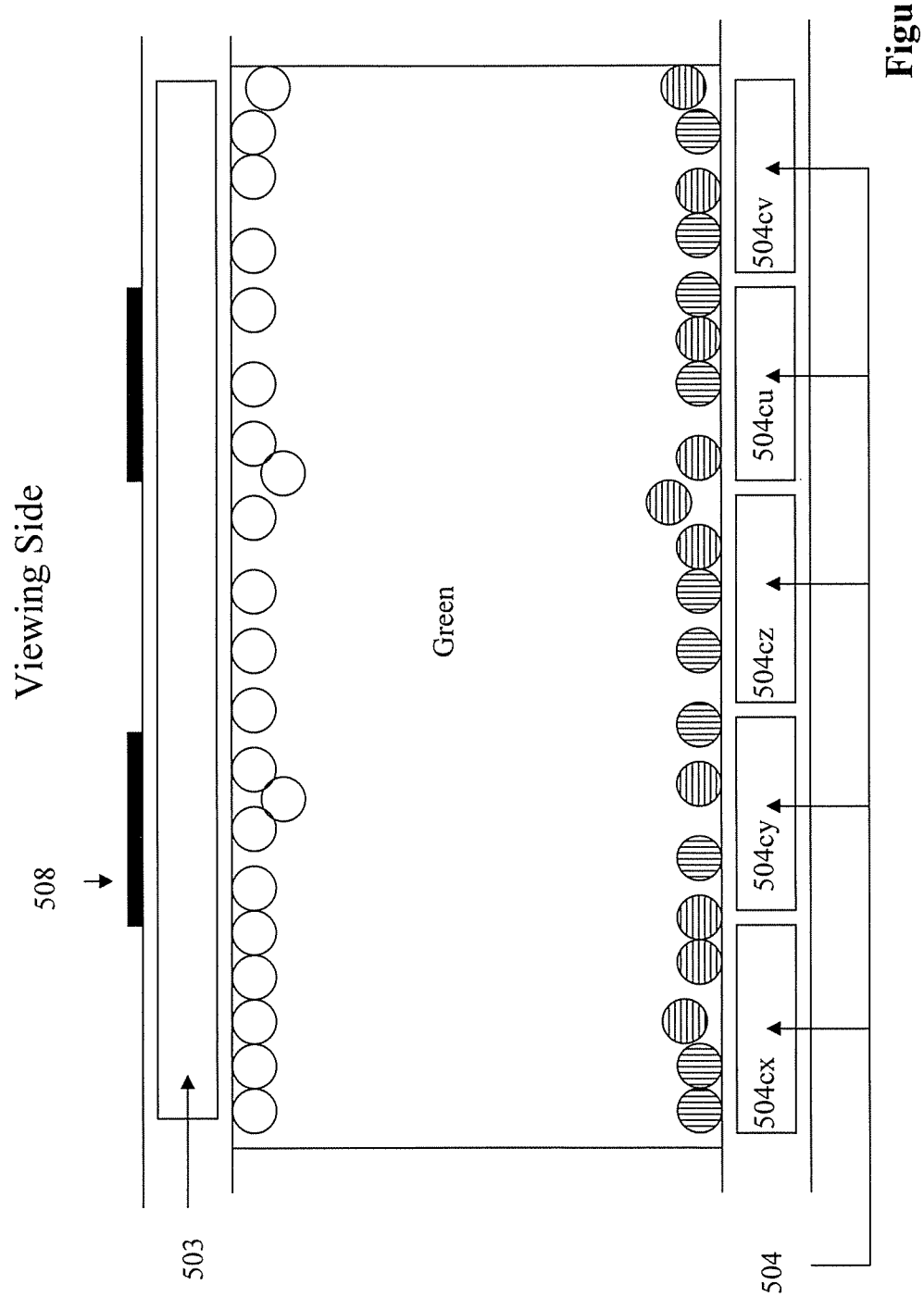
FIGS. 5a-5e illustrate how five different color states may be displayed.

FIG. 5a shows the white state at the viewing side by imposing a negative voltage potential to the common electrode (503), causing the positively charged white pigment particles to move to be at or near the common electrode (503), while the red and blue particles are at or near the driving electrodes (504). The white particles directly reflect the incoming light and show the viewer a non-compromised white state.

Figure 5B:
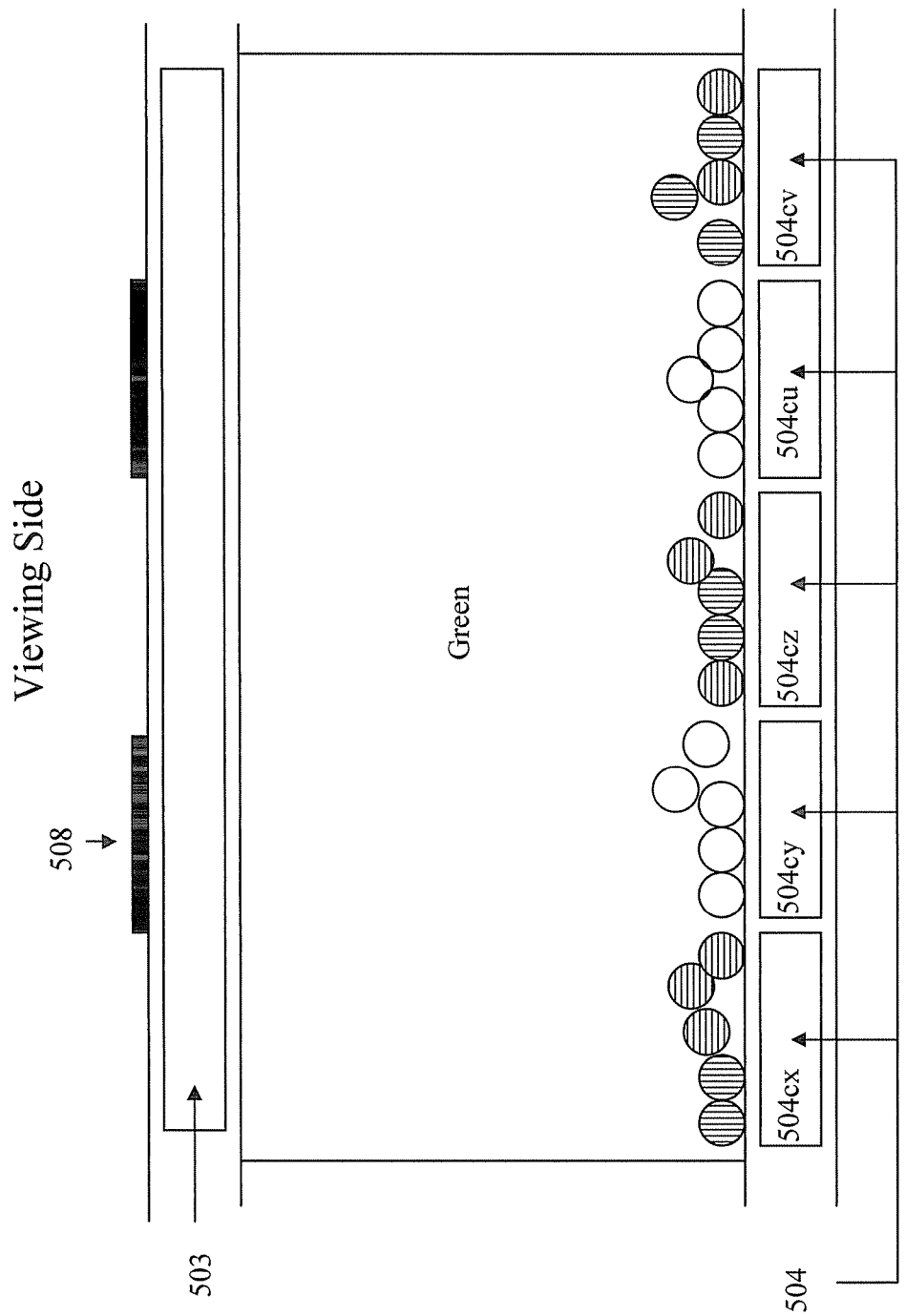

FIG. 5b shows the black state from the viewing side by moving the white particles to the designated driving electrodes (504cy and 504cu). The white particles are not visible from the viewing side due to the presence of a blocking layer (508) with registration to the designated electrodes. The blue and red particles are at or near the non-designated driving electrodes (504cx, 504cz and 504cv). Since the solvent is of the green color which does not transmit much red or blue color light, a black color is perceived and seen from the viewing side.

Figure 5C:
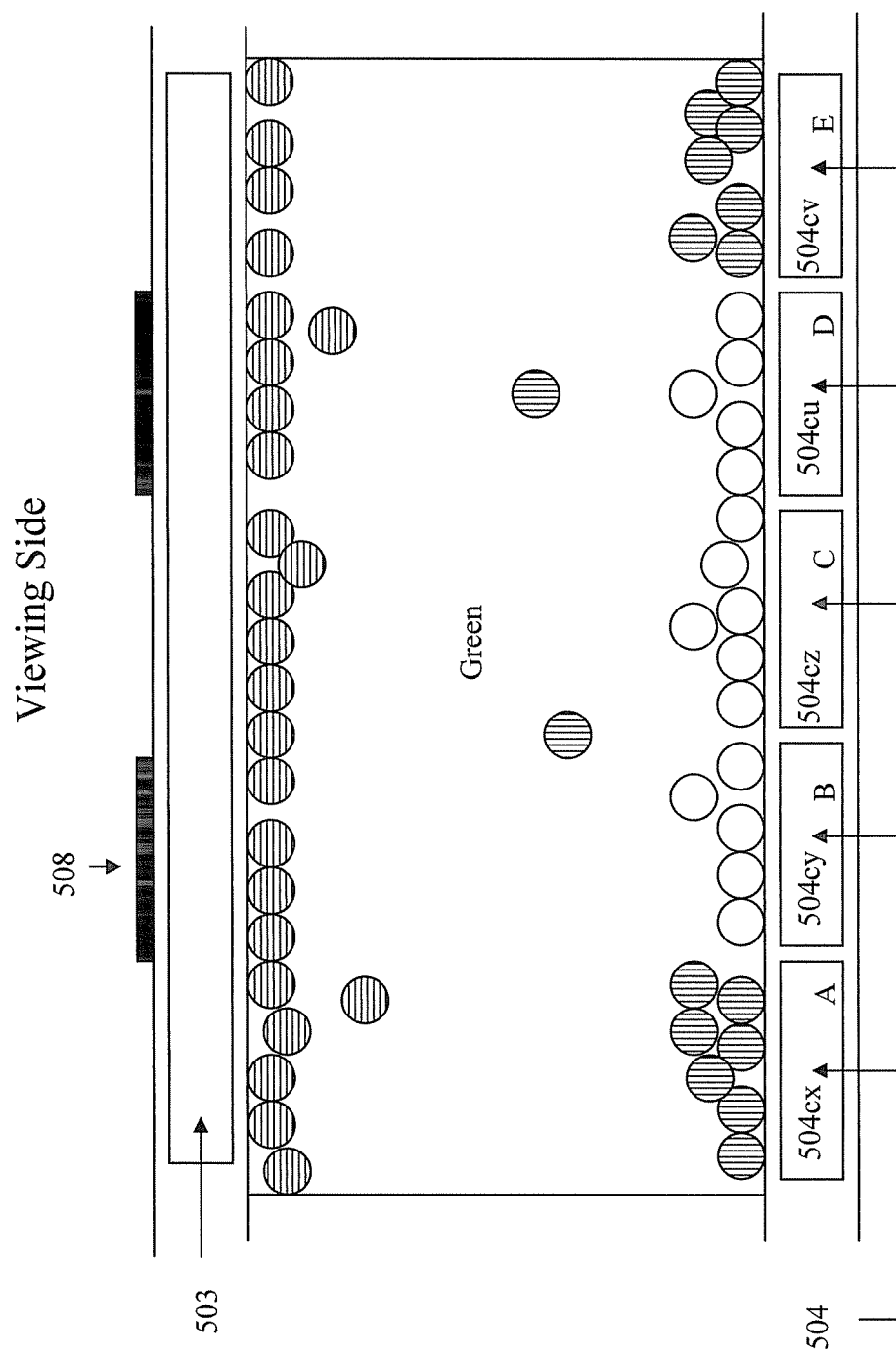

FIG. 5c shows the blue state from the viewing side by moving the blue pigment particles to be at or near the common electrode (503). In this case, a positive voltage potential is first imposed on the common electrode (503) and a negative voltage potential is imposed on selected driving electrodes (504) which are not necessarily the designated electrodes. For illustration purposed, the selected driving electrodes are marked B, C and D. As a result, the blue and red pigment particles move to be at or near the common electrode (503) whereas the white particles move to be at or near those selected driving electrodes (B, C and D).

In a second step, a strong positive voltage potential is imposed on the remaining driving electrodes A and E while a weaker positive voltage potential is imposed on the common electrode (503). Since the blue particles carry a weaker negative polarity than the red particles, they would move slower compared to the red particles under such an electric field. Accordingly, the blue particles will remain at or near the common electrode (503) while the red particles move to be at or near driving electrodes A and E.

Figure 5D:
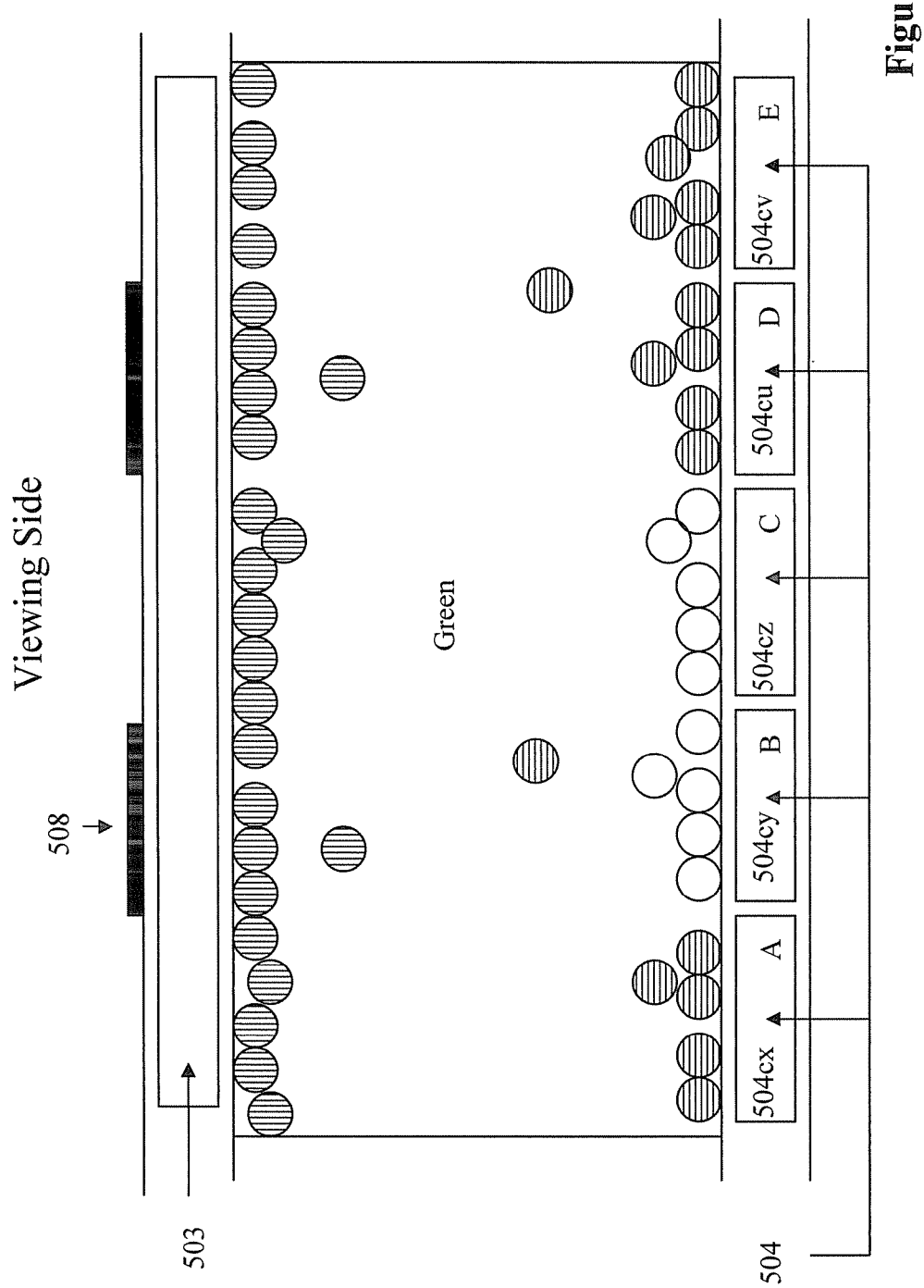

FIG. 5d shows the red state from the viewing side by moving the red particles to be at or near the common electrode (503). In this case, a positive voltage potential is first imposed on selected driving electrodes A, D and E and a negative voltage potential is imposed on the remaining driving electrodes B and C. The selected driving electrodes are not necessarily the designated electrodes. The common electrode (503) is held at ground. As a result, the blue and red pigment particles move to be at or near the driving electrodes A, D and E whereas the white particles move to be at or near the driving electrodes B and C.

In a second step, a strong positive voltage potential is imposed on the common electrode (503) while a weaker positive voltage potential is imposed on driving electrodes A, D and E. Since the red particles carry a stronger negative polarity than the blue particles, they would move faster to be at or near the common electrode (503) while the blue particles would remain at or near driving electrodes A, D and E.

Figure 5E:
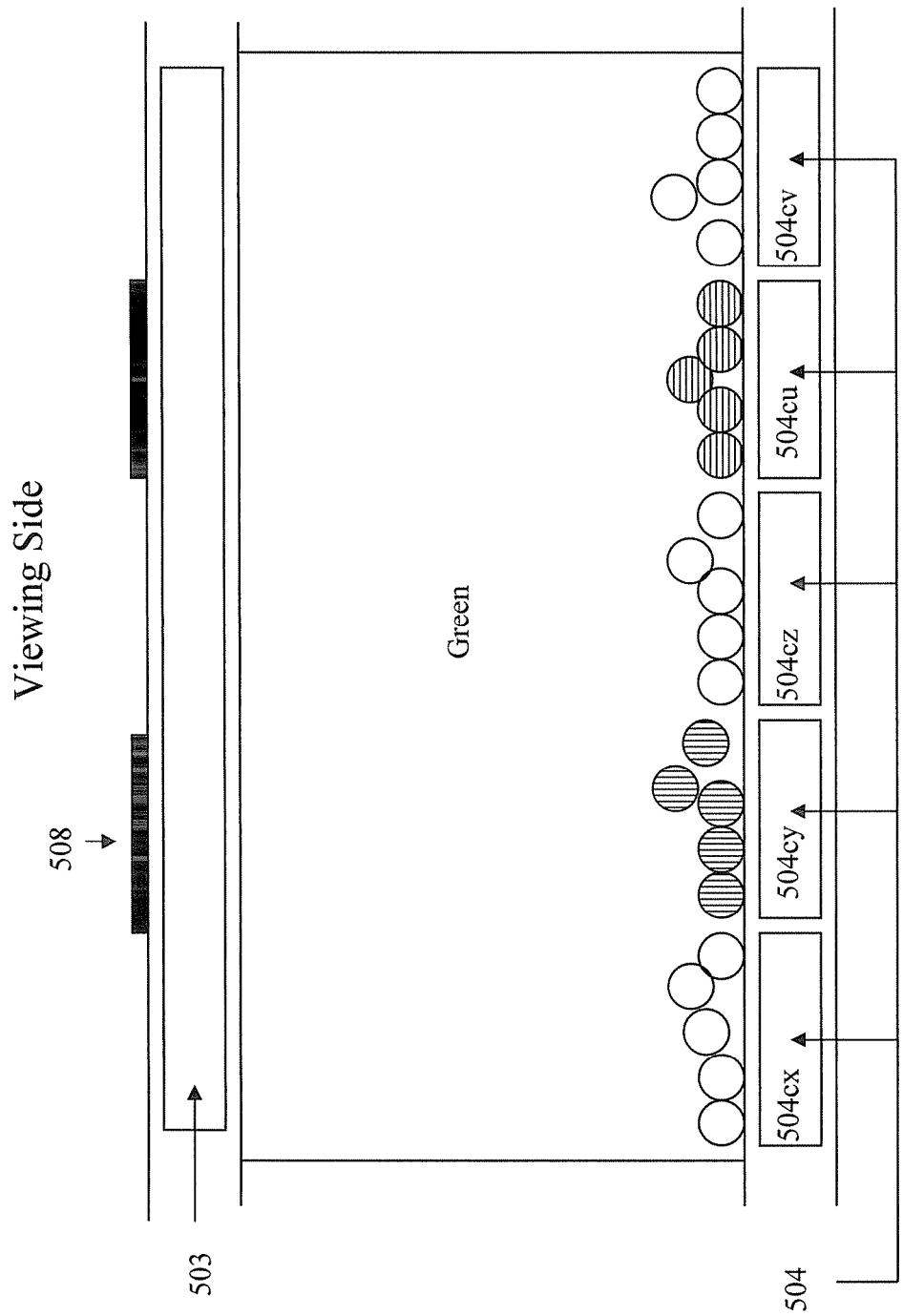

FIG. 5e shows the green state from the viewing side by moving the white particles to the non-designated electrodes (504cx, 504cz and 504cv) and the red and blue particles to the designated electrodes (504cy and 504cu), respectively. Since the red and blue particles are hidden from the viewing side, only the green color is seen from the viewing side.

The three types of particles system can display five color states, namely, white, black, red, green and blue in a single pixel, as shown in FIGS. 5a-5e.

IV. Configurations of Pixels

Each pixel in a display device of the present invention may be divided into a number of sub-pixels. The following examples are given based on the two types of particle system illustrated in Section II above.

Figure 6B:
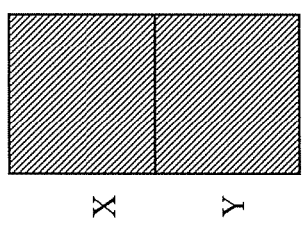
FIGS. 6a-6d illustrate different configurations of a pixel.
Figure 6D:
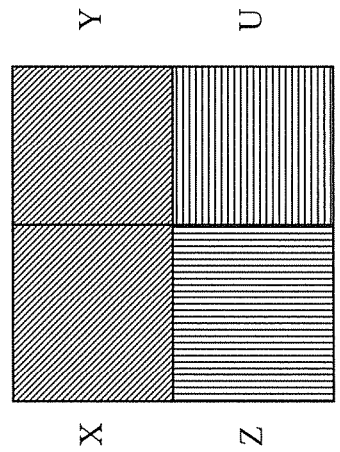
Figure 6A:
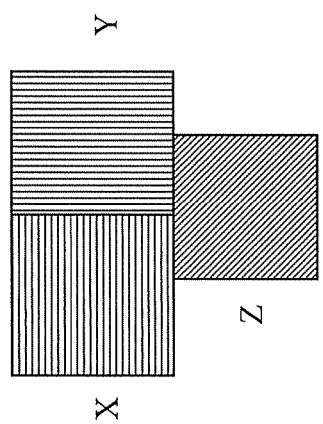

FIG. 6a shows an example of three sub-pixels (X, Y and Z) in a pixel. In sub-pixel X, the display cell is filled with an electrophoretic fluid comprising green and white pigment particles dispersed in a solvent of blue color. In sub-pixel Y, the display cell is filled with an electrophoretic fluid comprising blue and white pigment particles dispersed in a solvent of red color. In sub-pixel Z, the display cell is filled with an electrophoretic fluid comprising red and white pigment particles dispersed in a solvent of green color. In the system of FIG. 6a, a high quality white color may be achieved by turning all three sub-pixels to the white state and a high quality black color may be achieved by turning all three sub-pixels to the black state. All three sub-pixels may achieve the white state according to the example of FIG. 4b and they may achieve the black state according to the example of FIG. 4c or 4d.

For a green color, sub-pixel Z (with the green solvent) may be switched to the green state by spreading the white pigment particles across the non-designated driving electrodes according to the example of FIG. 4e and sub-pixel X (with the green particles) is switched to the green state by moving the green particles to be at or near the common electrode according to the example of FIG. 4a. Sub-pixel Y, in this case, may be switched to the black state according to the example of FIG. 4c or 4d. The viewer, on the viewing side, cannot resolve the three sub-pixels with naked eyes and as a result, will see a green color (i.e., two out of three sub-pixels being green). The green color provided by the present system therefore is twice as intense as the green color provided by the RGB system, thus significantly improving the brightness of the color states.

Alternatively, sub-pixel Y may be switched to the white state if a higher level of brightness with less color saturation is desired. This less saturated green option for sub-pixel Y provides even more brightness.

A red or blue color may be similarly achieved by the pixel having three sub-pixels X, Y and Z, as shown in FIG. 6a.

FIG. 6b is an example in which one pixel consists of only two sub-pixels (X and Y). In sub-pixel X, the display cell is filled with an electrophoretic fluid comprising red and white pigment particles dispersed in a solvent of green color. In sub-pixel Y, the display cell is filled with an electrophoretic fluid comprising blue and white pigment particles dispersed in a solvent of green color. In the system of FIG. 6b, a high quality white color may be achieved by turning both sub-pixels X and Y to the white state and a high quality black color may be achieved by turning both sub-pixels X and Y to the black state. Both sub-pixels may achieve the white state according to the example of FIG. 4b and the black state according to the example of FIG. 4c or 4d.

For a green color, both sub-pixels X and Y may be switched to the green state by spreading the white pigment particles across the non-designated driving electrodes and it provides a 100% effective area of reflectance of the green color. It is also capable of providing a red state with sub-pixel X being switched to red and sub-pixel Y being switched to black. Similarly a blue color may be achieved by switching sub-pixel X to black and sub-pixel Y to blue. The red and blue colors achieved by the present system have a higher quality than those achieved by the RGB color system, because in the present system one half of the pixel shows the intended color whereas in the RGB system only one third of the pixel shows the intended color.

Figure 6C:
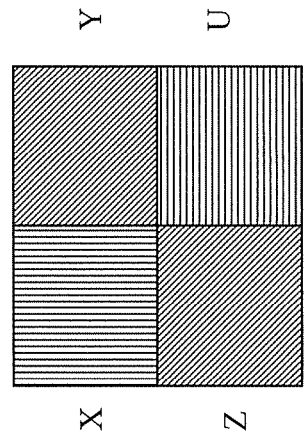

FIGS. 6c and 6d provide additional examples. Each pixel in the two figures consists of four sub-pixels.

In FIG. 6c, in sub-pixel X, the display cell is filled with an electrophoretic fluid comprising blue and white particles dispersed in a solvent of red color. In sub-pixel Y, the display cell is filled with an electrophoretic fluid comprising red and white particles dispersed in a solvent of green color. In sub-pixel Z, the display cell is filled with an electrophoretic fluid comprising blue and white particles dispersed in a solvent of green color. In sub-pixel U, the display cell is filled with an electrophoretic fluid comprising green and white particles dispersed in a solvent of blue color.

In FIG. 6d, in sub-pixel X, the display cell is filled with an electrophoretic fluid comprising blue and white particles dispersed in a solvent of green color. In sub-pixel Y, the display cell is filled with an electrophoretic fluid comprising red and white particles dispersed in a solvent of green color. In sub-pixel Z, the display cell is filled with an electrophoretic fluid comprising green and white particles dispersed in a solvent of red color. In sub-pixel U, the display cell is filled with an electrophoretic fluid comprising green and white particles dispersed in a solvent of blue color.

There may be many other pixel designs that could be developed to provide the optimal output. In all cases, however, much superior color performance is achieved compared to the RGB system and it is achieved with no compromise in black and white color states.

The three types of particle system as illustrated in Section III above provide further improved qualities of red, green, blue, white and black color states without compromise because each color has fully (100%) utilized its area of reflection.

V. Blocking Layers (a) Black Matrix Layers

In one embodiment of the present invention, the blocking layer is a black matrix layer (705*a*) on the viewing side of the color display, as shown in FIG. 7*a*. The display cell (700) is sandwiched between a first layer (701) comprising a common electrode (703) and a second layer (702) comprising driving electrodes (704). The designated electrode (704*cy*) is shown to be located underneath the black matrix layer (705*a*). As a result, the charged pigment particles gathered at or near the designated electrode (704*cy*) will not be seen, from the viewing side.

The black matrix layer may be applied by a method such as printing, stamping, photolithography, vapor deposition or sputtering with a shadow mask. The optical density of the black matrix may be higher than 0.5, preferably higher than 1. Depending on the material of the black matrix layer and the process used to dispose the black matrix, the thickness of the black matrix may vary from 0.005 µm to 50 µm, preferably from 0.01 µm to 20 µm.

In one embodiment, a thin layer of black coating or ink may be transferred onto the surface where the black matrix layers will appear, by an offset rubber roller or stamp.

In another embodiment, a photosensitive black coating may be coated onto the surface where the black matrix layers will appear and exposed through a photomask. The photosensitive black coating may be a positively-working or negatively-working resist. When a positively-working resist is used, the photomask have openings corresponding to the areas not intended to be covered by the black matrix layer. In this case, the photosensitive black coating in the areas not intended to be covered by the black matrix layer (exposed) is removed by a developer after exposure. If a negatively-working resist is used, the photomask should have openings corresponding to the areas intended to be covered by the black matrix layer. In this case, the photosensitive black coating in the areas not intended to be covered by the black matrix layer (unexposed) is removed by a developer after exposure. The solvent(s) used to apply the black coating and the developer(s) for removing the coating should be carefully selected so that they do not attack the layer of the display and other structural elements.

Alternatively, a colorless photosensitive ink-receptive layer may be applied onto the surface where the black matrix layers will appear, followed by exposure through a photomask. If a positively-working photosensitive latent ink-receptive layer is used, the photomask should have openings corresponding to the areas intended to be covered by the black matrix layer. In this case, after exposure, the exposed areas become ink-receptive or tacky and a black matrix may be formed on the exposed areas after a black ink or toner is applied onto those areas. Alternatively, a negatively-working photosensitive ink-receptive layer may be used. In this case, the photomask should have openings corresponding to the areas not intended to be covered by the black matrix layer and after exposure, the exposed areas (which are not intended to be covered by the black matrix layer) are hardened while a black matrix layer may be formed on the unexposed areas (which are intended to be covered by the black matrix layer) after a black ink or toner is applied onto those areas. The black matrix may be post cured by heat or flood exposure to improve the film integrity and physical-mechanical properties.

In another embodiment, the black matrix may be applied by printing such as screen printing or offset printing, particularly waterless offset printing.

FIG. 10*a* shows how the black matrix layers (1003*a*) are aligned with the designated electrodes (1002) to allow the designated electrodes to be hidden from the viewer. To achieve the "hiding" effect, the width (w1) of the black matrix layer (1003*a*) must be at least equal to the width (w2) of the designated electrode(s) (1002). It is desirable that the width (w1) of the black matrix layers is slightly greater than the width (w2) of the designated electrode(s) to prevent loss of contrast when viewed at an angle.

In another embodiment, the black matrix layers are not aligned with the designated electrodes. In this case, the width of the black matrix layers is significantly greater than the width of the designated electrodes, so that the designated electrodes may be hidden from the incoming light.

(b) Bright Enhancement Structure

In another embodiment, the blocking layer may be a brightness enhancement structure (708) comprising micro-structures or micro-reflectors (705*b*) on the viewing side of the display device, as shown in FIG. 7*b*. The display cell (700) is sandwiched between a first layer (701) comprising a common electrode (703) and a second layer (702) comprising driving electrodes (704). The designated electrode (704*cy*) is shown to be located underneath the micro-structure or micro-reflector (705*b*). As a result, the charged pigment particles gathered at or near the designated electrode (704*cy*) will not be seen, from the viewing side, using the micro-structures or micro-reflectors to block the designated electrodes. In the context of the present invention, the cavity 705*b* is referred to as the "micro-microstructure" or "micro-reflector".

In the context of the present invention, the surface of the micro-structures is uncoated. The term "micro-reflector" refers to a micro-structure the surface of which is coated with a metal layer. Details of the brightness enhancement structure and how it is fabricated are given below.

The brightness enhancement structure may be fabricated in many different ways. The details of the brightness enhancement structure are disclosed in U.S. patent application Ser. Nos. 12/323,300, 12/323,315, 12/370,485 and 12/397,917, the contents of which are incorporated herein by reference in their entirety.

Figure 8A:
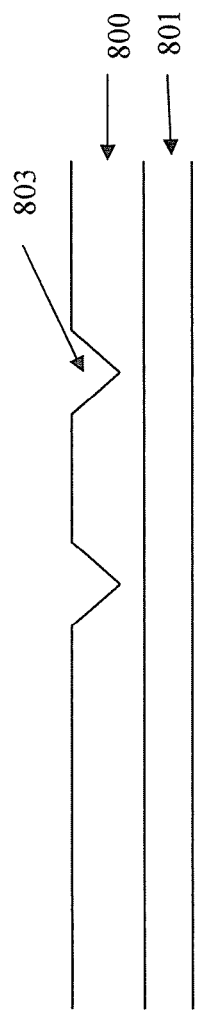

In one embodiment, the brightness enhancement structure may be fabricated separately and then laminated over the viewing side of the display device. For example, the brightness enhancement structure may be fabricated by embossing as shown in FIG. 8*a*. The embossing process is carried out at a temperature higher than the glass transition temperature of the embossable composition (800) coated on a substrate layer (801). The embossing is usually accomplished by a male mold which may be in the form of a roller, plate or belt. The embossable composition may comprise a thermoplastic, thermoset or a precursor thereof. More specifically, the embossable composition may comprise multifunctional acrylate or methacrylate, multifunctional vinylether, multifunctional epoxide or an oligomer or polymer thereof. The glass transition temperatures (or Tg) for this class of materials usually range from about −70° C. to about 150° C., preferably from about −20° C. to about 50° C. The embossing process is typically carried out at a temperature higher than the Tg. A heated male mold or a heated housing substrate against which the mold presses may be used to control the embossing temperature and pressure. The male mold is usually formed of a metal such as nickel.

As shown in FIG. 8a, the mold creates the prism-like brightness enhancement micro-structures (803) and is released during or after the embossable composition is hardened. The hardening of the embossable composition may be accomplished by cooling, solvent evaporation, cross-linking by radiation, heat or moisture. In the context of the present invention, the cavity (803) is called a micro-structure.

The refraction index of the material for forming the brightness enhancement structure is preferably greater than about 1.4, more preferably between about 1.5 and about 1.7.

Figure 9A:
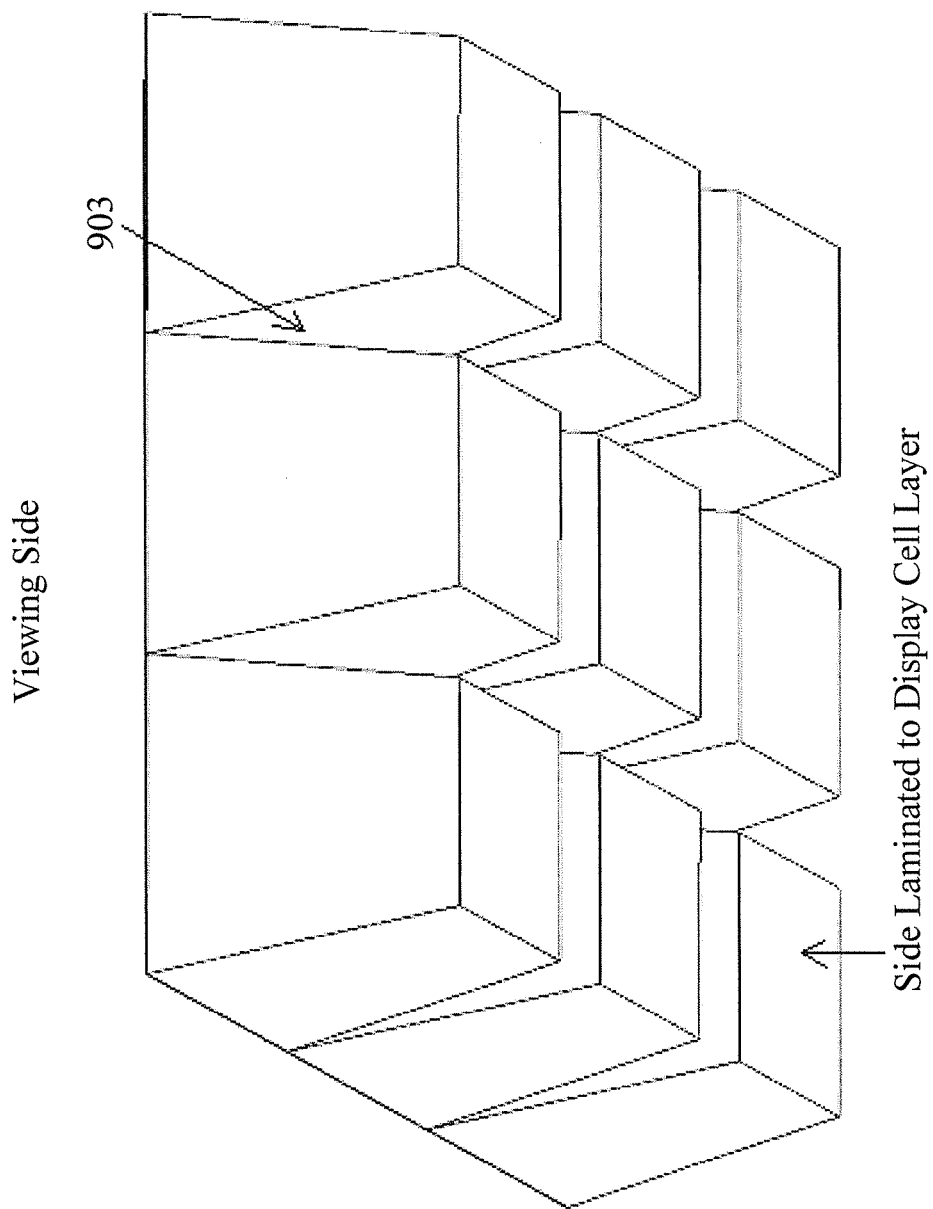
FIG. 9a is a three dimensional view of the brightness enhancement structure with micro-structures or micro-reflectors.

FIG. 9a is a three-dimensional view of the brightness enhancement structure with brightness enhancement micro-structures (903) corresponding to those (803) as shown in FIG. 8a.

Figure 9B:
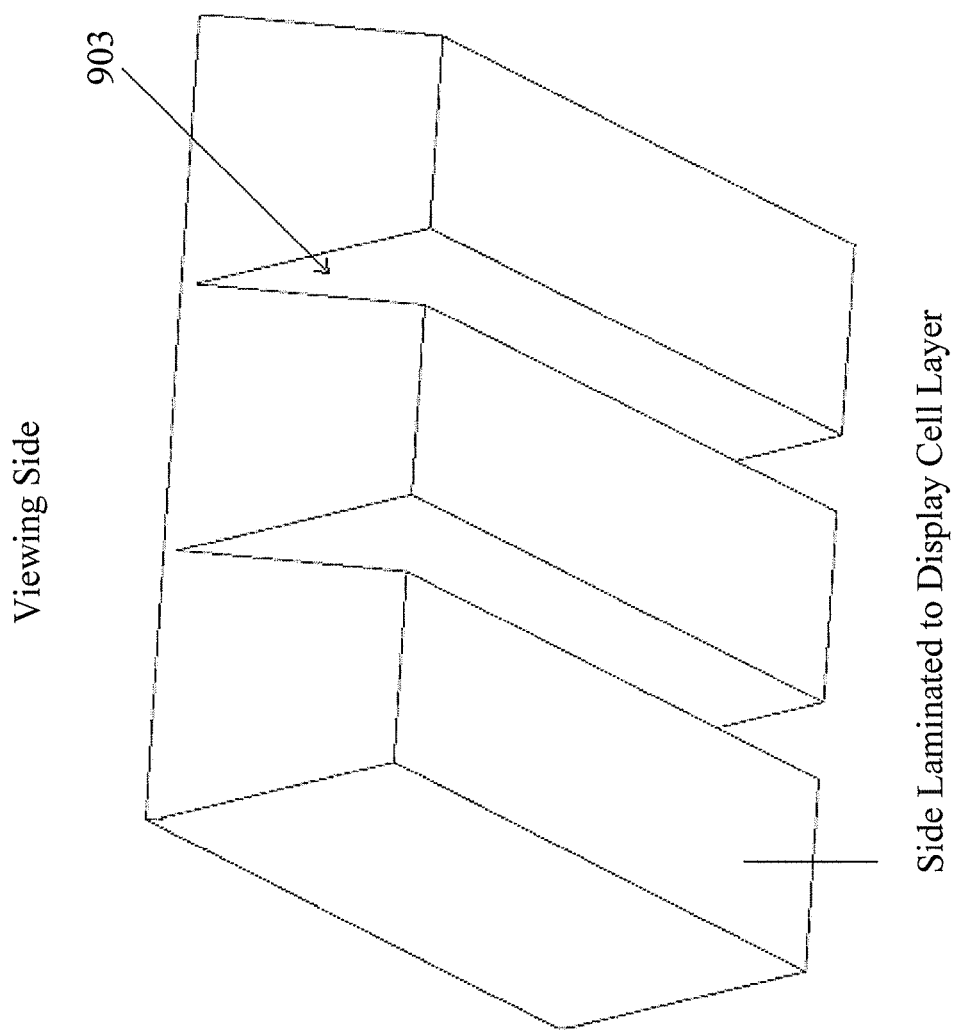
FIG. 9b is an alternative design of a brightness enhancement structure.

FIG. 9b is an alternative design of the brightness enhancement structure. The micro-structures or micro-reflectors (903) are in a continuous form. The continuous micro-structures or micro-reflectors are particularly suitable for a display device with a second layer comprising driving electrodes as shown in FIG. 1d.

The brightness enhancement structure may be used as is or further coated with a metal layer.

Figure 8B:
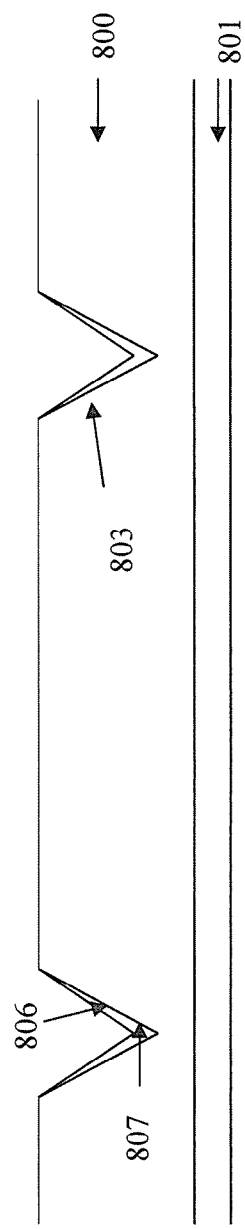

The metal layer (807) is then deposited over the surface (806) of the micro-structures (803) as shown in FIG. 8b. Suitable metals for this step may include, but are not limited to, aluminum, copper, zinc, tin, molybdenum, nickel, chromium, silver, gold, iron, indium, thallium, titanium, tantalum, tungsten, rhodium, palladium, platinum and cobalt. Aluminum is usually preferred. The metal material must be reflective, and it may be deposited on the surface (806) of the micro-structures, using a variety of techniques such as sputtering, evaporation, roll transfer coating, electroless plating or the like.

In order to facilitate formation of the metal layer only on the intended surface (i.e., the surface 806 of the micro-structures), a strippable masking layer may be coated before metal deposition, over the surface on which the metal layer is not to be deposited. As shown in FIG. 8c, a strippable masking layer (804) is coated onto the surface (805) between the openings of the micro-structures. The strippable masking layer is not coated on the surface (806) of the micro-structures.

The coating of the strippable masking layer may be accomplished by a printing technique, such as flexographic printing, driographic printing, electrophotographic printing, lithographic printing, gravure printing, thermal printing, inkjet printing or screen printing. The coating may also be accomplished by a transfer-coating technique involving the use of a release layer. The strippable masking layer preferably has a thickness in the range of about 0.01 to about 20 microns, more preferably about 1 to about 10 microns.

For ease of stripping, the layer is preferably formed from a water-soluble or water-dispersible material. Organic materials may also be used. For example, the strippable masking layer may be formed from a re-dispersible particulate material. The advantage of the re-dispersible particulate material is that the coated layer may be easily removed without using a solubility enhancer. The term "re-dispersible particulate" is derived from the observation that the presence of particles in the material in a significant quantity will not decrease the stripping ability of a dried coating and, on the contrary, their presence actually enhances the stripping speed of the coated layer.

The re-dispersible particulate consists of particles that are surface treated to be hydrophilic through anionic, cationic or non-ionic functionalities. Their sizes are in microns, preferably in the range of about 0.1 to about 15 um and more preferably in the range of about 0.3 to about 8 um. Particles in these size ranges have been found to create proper surface roughness on a coated layer having a thickness of <15 um. The re-dispersible particulate may have a surface area in the range of about 50 to about 500 $m^2/g$, preferably in the range of about 200 to about 400 $m^2/g$. The interior of the re-dispersible particulate may also be modified to have a pore volume in the range of about 0.3 to about 3.0 ml/g, preferably in the range of about 0.7 to about 2.0 ml/g.

Commercially available re-dispersible particulates may include, but are not limited to, micronized silica particles, such as those of the Sylojet series or Syloid series from Grace Davison, Columbia, Md., USA.

Non-porous nano sized water re-dispersible colloid silica particles, such as LUDOX AM can also be used together with the micron sized particles to enhance both the surface hardness and stripping rate of the coated layer.

Other organic and inorganic particles, with sufficient hydrophilicity through surface treatment, may also be suitable. The surface modification can be achieved by inorganic and organic surface modification. The surface treatment provides the dispensability of the particles in water and the re-wettability in the coated layer.

In FIG. 8d, a metal layer (807) is shown to be deposited over the entire surface, including the surface (806) of the micro-structures and the surface (805) between the micro-structures. Suitable metal materials are those as described above. The metal material must be reflective and may be deposited by a variety of techniques previously described.

Figure 8E:
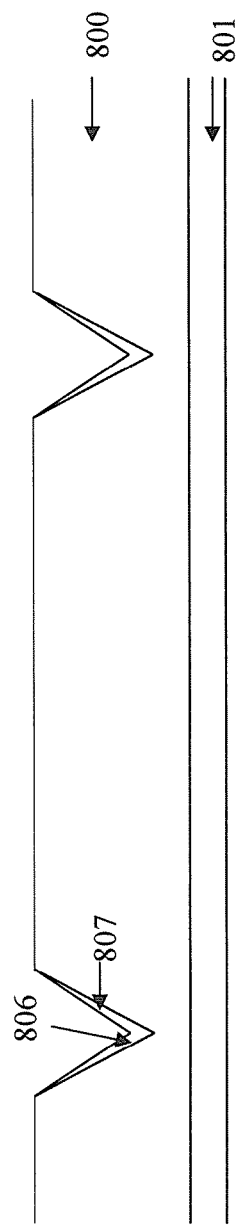

FIG. 8e shows the structure after removal of the strippable masking layer (804) with the metal layer 807 coated thereon. This step may be carried out with an aqueous or non-aqueous solvent such as water, MEK, acetone, ethanol or isopropanol or the like, depending on the material used for the strippable masking layer. The strippable masking layer may also be removed by mechanical means, such as brushing, using a spray nozzle or peeling it off with an adhesive layer. While removing the strippable masking layer (804), the metal layer (807) deposited on the strippable masking layer is also removed, leaving the metal layer (807) only on the surface (806) of the micro-structures.

Figure 8F:
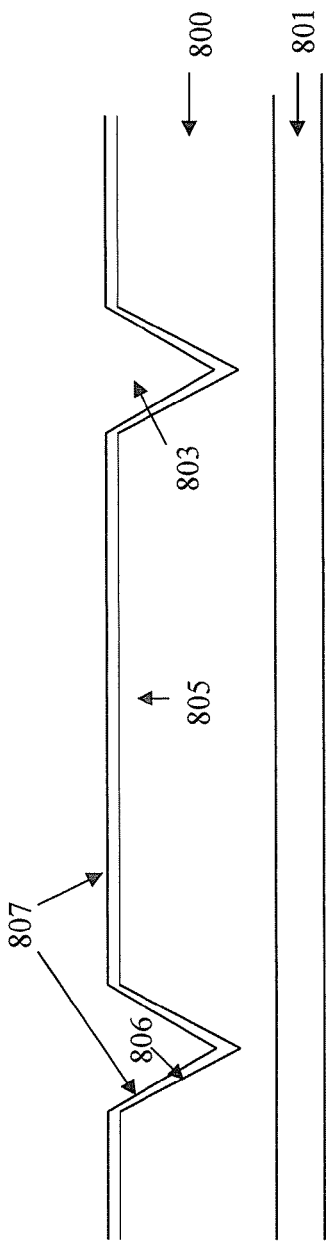
Figure 8G:
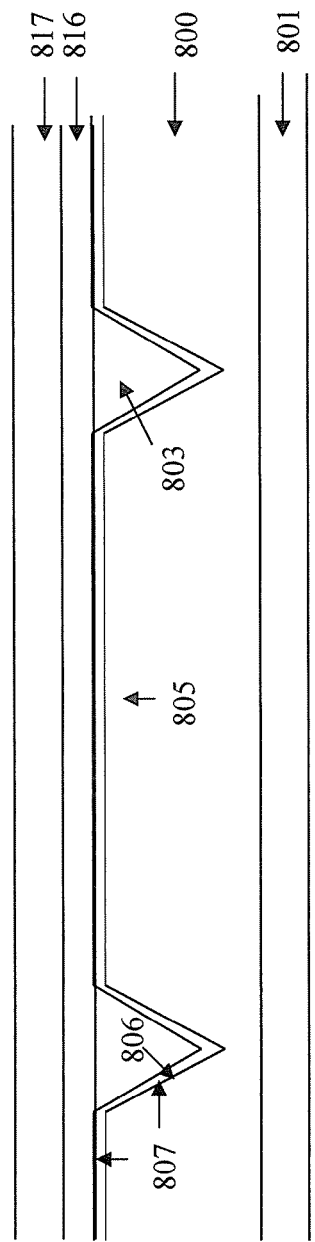

FIGS. 8f and 8g depict an alternative process for depositing the metal layer. In FIG. 8f, a metal layer (807) is deposited over the entire surface first, including both the surface (806) of the micro-structures and the surface (805) between the micro-structures. FIG. 8g shows that the film of micro-structures deposited with a metal layer (807) is laminated with a film (817) coated with an adhesive layer (816). The metal layer (807) on top of the surface (805) may be conveniently peeled off when the micro-structure film is delaminated (separated) from the adhesive layer (816) coated film (817). The thickness of the adhesive layer (816) on the adhesive coated film is preferably in the range of about 1 to about 50 um and more preferably in the range of about 2 to about 10 um.

The brightness enhancement structure comprising microstructures (uncoated with a metal layer) or micro-reflectors (coated with a metal layer) is then laminated over a layer of display cells as described above.

FIG. 10b shows how the micro-structures or micro-reflectors (1003b) are aligned with the designated electrodes to allow the designated electrodes to be hidden from the viewer. To achieve the "hiding" effect, the width (w3) of the base (1001) of the micro-structure or micro-reflector (1003b) must be at least equal to the width (w4) of the designated electrode(s) (1002). It is acceptable if the width (w3) of the base of the micro-structure or micro-reflector is slightly greater than the width (w4) of the designated electrode(s).

The brightness enhancement structure (1000) is formed of a high refractive index material, and the tilted surface (1004) is reflective to the incoming light source due to the total internal reflection (TIR) phenomenon. The area underneath the micro-structure or micro-reflector will not receive any light. During the state while the color of the background layer is shown, the charged pigment particles migrate to those designated electrodes underneath the micro-structures or micro-reflectors, thus avoiding light leakage.

In another embodiment, the micro-structures or micro-reflectors are not aligned with the designated electrodes. In this case, the width of the base of the microstructures or micro-reflectors is significantly greater than the width of the designated electrodes, so that the designated electrodes may be hidden from the incoming light.

VI. Alternative Designs

FIGS. 11a-11d depict an alternative design of color display devices. In this alternative design, the color display device does not require black matrix layers or a brightness enhancement structure.

The display cell (1100), in this design, is also sandwiched between a first layer (1101) and a second layer (1102). The first layer comprises a common electrode (1103). The second layer comprises more than one driving electrodes.

While only three driving electrodes are shown, it is understood that there may be more driving electrodes and in any case, it is assumed that only driving electrode 1104cy is the designated electrode.

As shown the color display device is viewed from the driving electrode side (i.e., the second layer) instead of the common electrode side (i.e., the first layer).

The driving electrode layer also comprises multiple driving electrodes as shown in FIG. 1b. While only a 3×3 grid is shown in FIG. 1b, the driving electrodes may be of a grid which is at least 2×2. The multiple driving electrodes within a display cell allow the particles to migrate to one or more designated electrodes or evenly spread over all the driving electrodes.

In this design, the non-designated driving electrodes are transparent and the designated electrode(s) is/are non-transparent. The designated electrodes may be opaque.

There are two types of pigment particles in the electrophoretic fluid filled in the display cell. The two types of pigment particles are of the white and blue colors respectively, and they move independently from each other because they carry charges of opposite polarities. It is assumed that the white pigment particles are negatively charged and the blue pigment particles are positively charged. It is also assumed that the two types of pigment particles are dispersed in a solvent of green color.

Figure 11A:
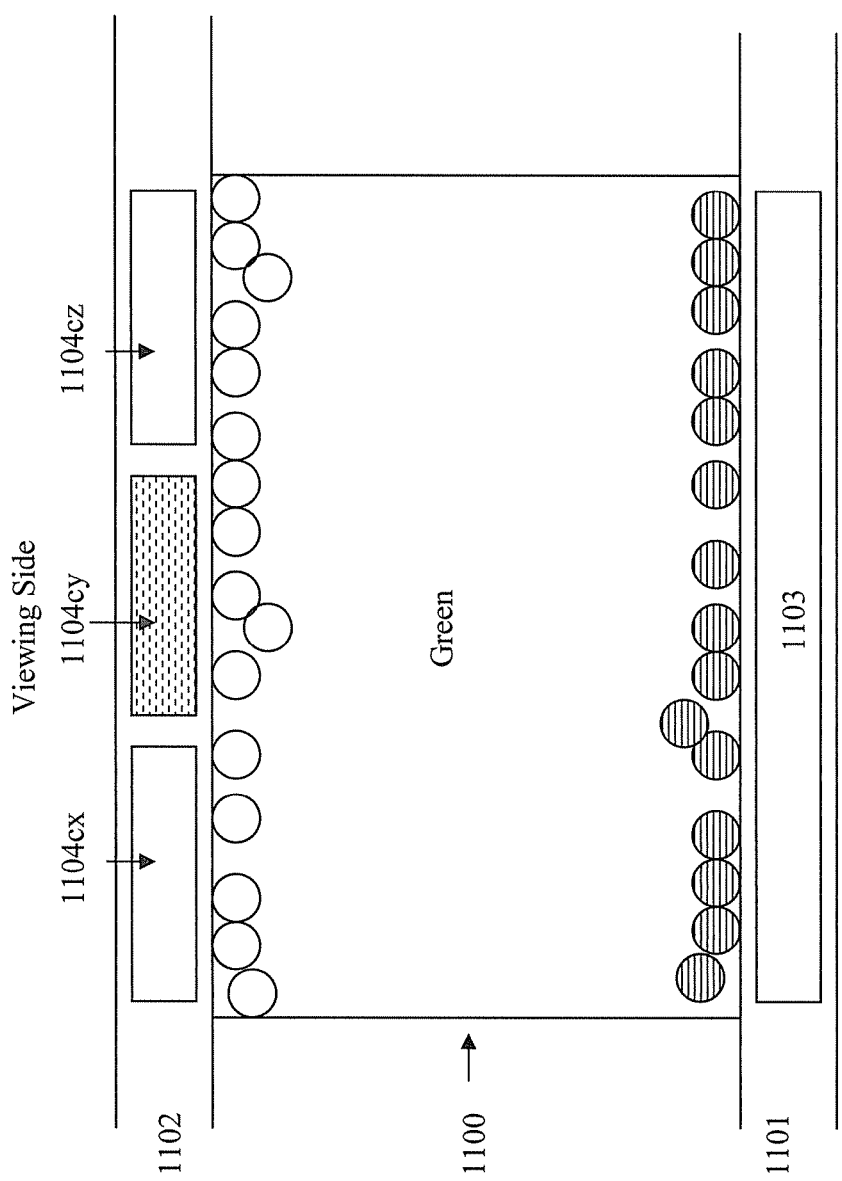
FIGS. 11a-11d depict an alternative design of color display devices of the present invention.

In FIG. 11a, a negative voltage potential is imposed on the common electrode (1103) and a positive voltage potential is imposed on the driving electrodes (1104), the negatively charged white particles are drawn to the driving electrodes (1104) and the positively charged blue particles to the common electrode (1103). As a result, a white color is seen at the viewing side, as shown in FIG. 11a.

Figure 11B:
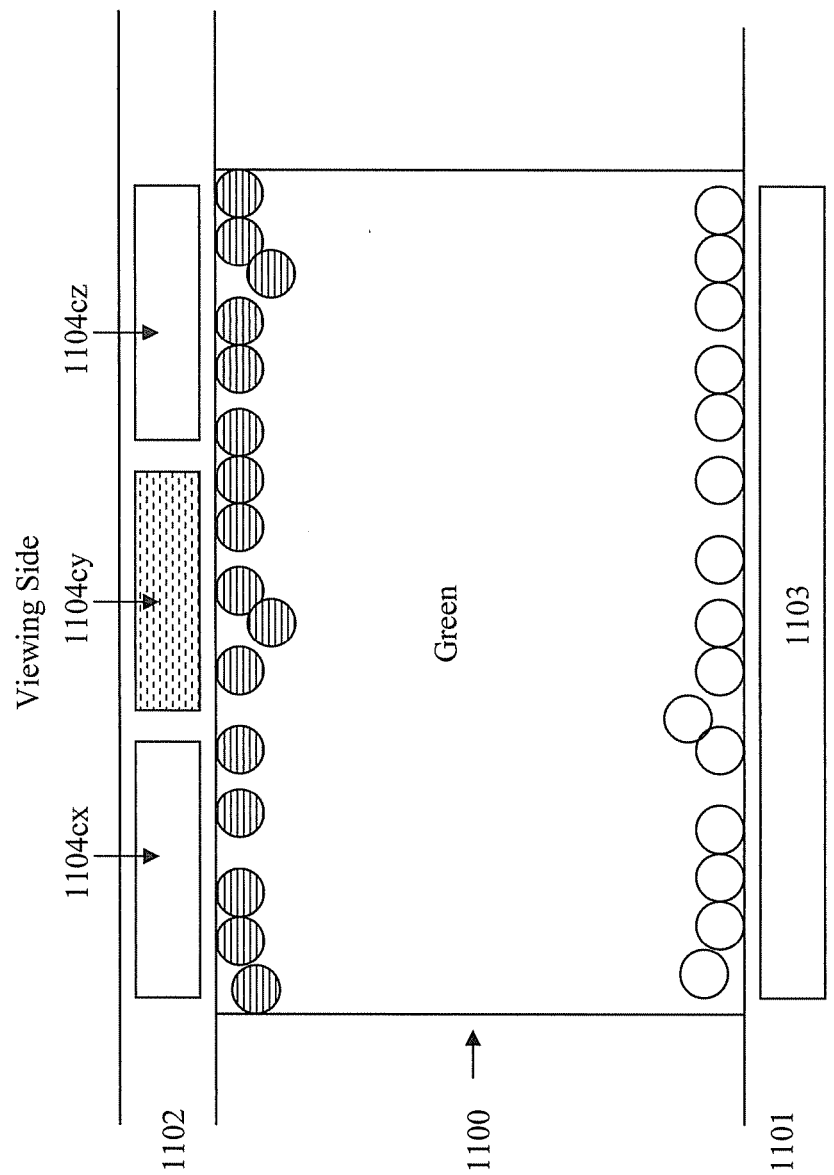

In FIG. 11b, when a negative voltage potential is imposed on the driving electrodes (1104) and a positive voltage potential is imposed on the common electrode (1103), the positively charged blue particles are drawn to the driving electrodes (1104) and the negatively charged white particles to the common electrode (1103). As a result, a blue color is seen at the viewing side.

Figure 11C:
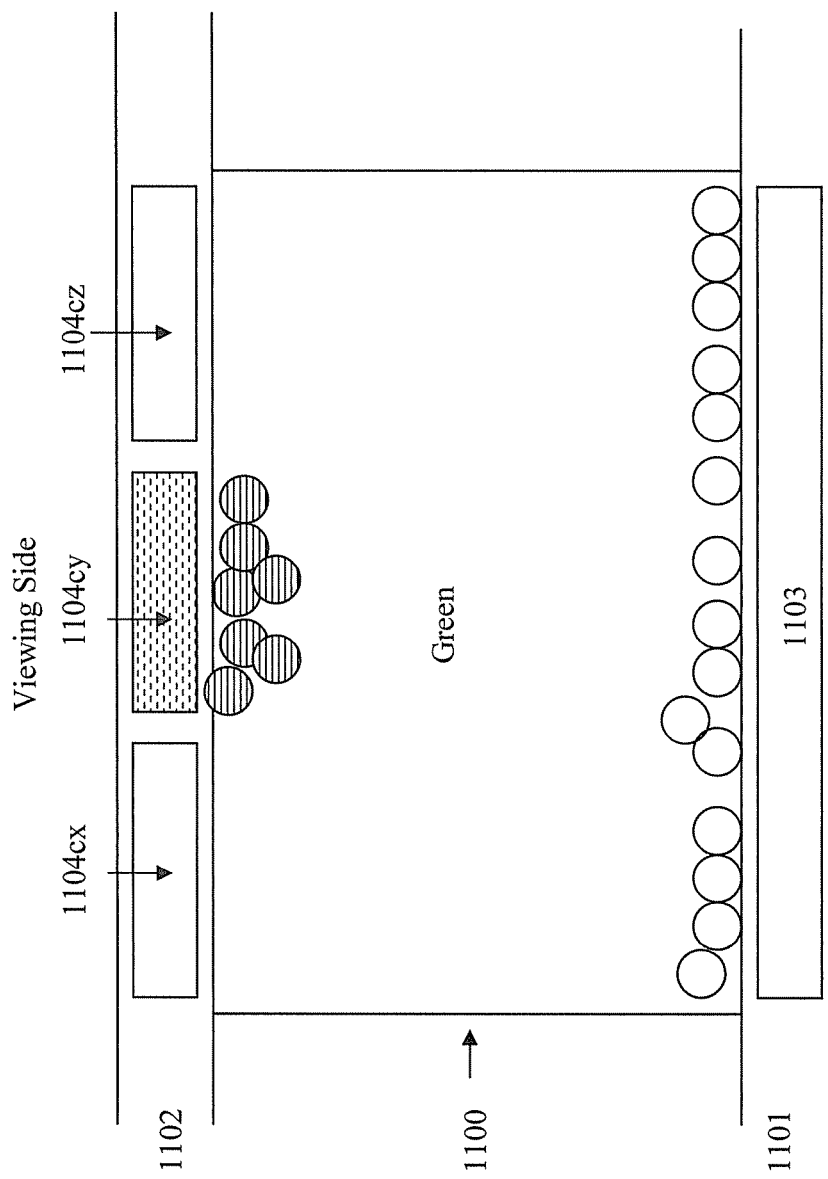

FIG. 11c shows a scenario in which a negative voltage potential is imposed on the designated electrode (1104cy) and a positive voltage potential is imposed on the common electrode (1103). The non-designated driving electrodes (1104cx and 1104cz) are held at ground. In this case, the negatively charged white particles move to be at or near the common electrode (1103) while the positively charged blue pigment particles move to be at or near the designated electrode (1104cy). The blue particles are hidden from the viewer because the designated electrode is non-transparent. As a result, a green color is seen from the viewing side.

While only one driving electrode (1104cy) is shown to be a designed electrode, in practice, the number of such designated electrodes may be more than one. In other words, there may be one or more such designated electrodes. The one designated electrode or multiple designated electrodes may be any of the driving electrodes, location wise.

Figure 11D:
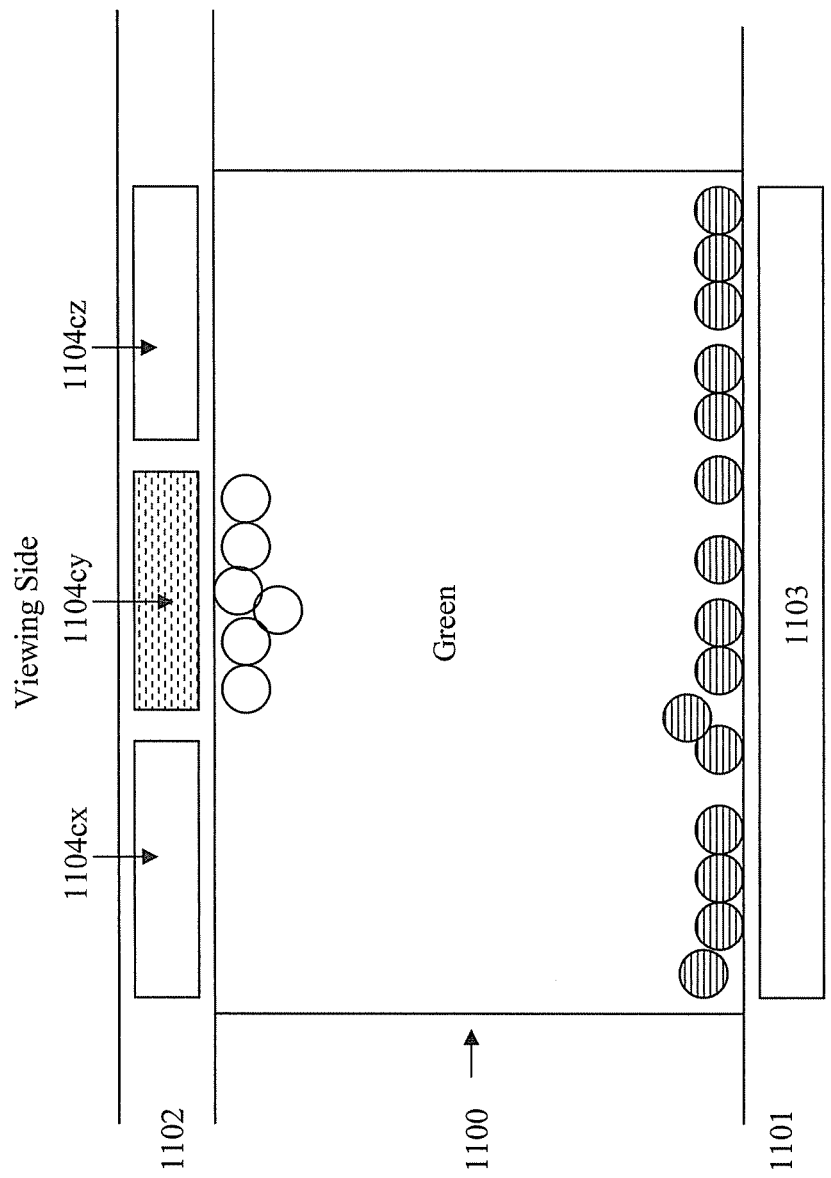

FIG. 11d shows another scenario in which a negative voltage potential is imposed on the common electrode (1103) and a positive voltage potential is imposed on the designated electrode (1104cy). The non-designated driving electrodes (1104cx and 1104cz) are held at ground. In this case, the negatively charged white particles move to be at or near the designated driving electrode (1104cy) and the positively charged blue particles move to be at or near the common electrode. Since the green color of the solvent does not transmit a significant amount of the blue light, a black color is perceived and seen from the viewing side.

The two types of particles system can display four color states, namely, white, black, green and blue, as exemplified in FIGS. 11a-11d.

FIGS. 12a-12e illustrate an alternative design with three types of particles. The particle and solvent system of FIGS. 12a-12e is the same as that of FIGS. 5a-5e. Namely, white, red and blue particles are dispersed in a solvent of green color. It is assumed that the white particles are positively charged, while the blue particles carry a weaker negative polarity and red particles carry a stronger negative polarity.

In this alternative design, the color display device does not require black matrix layers or a brightness enhancement structure. The display cell (1200) is sandwiched between a first layer (1201) and a second layer (1202). The first layer comprises a common electrode (1203). The second layer comprises more than one driving electrodes.

While only five driving electrodes are shown, it is understood that there may be more driving electrodes and in any case, it is assumed that only driving electrodes 1204cy and 1204cu are the designated electrodes.

As shown the color display device is viewed from the driving electrode side (i.e., the second layer) instead of the common electrode side (i.e., the first layer). The non-designated driving electrodes are transparent and the designated electrode(s) is/are non-transparent. The designated electrodes may be opaque.

Figure 12A:
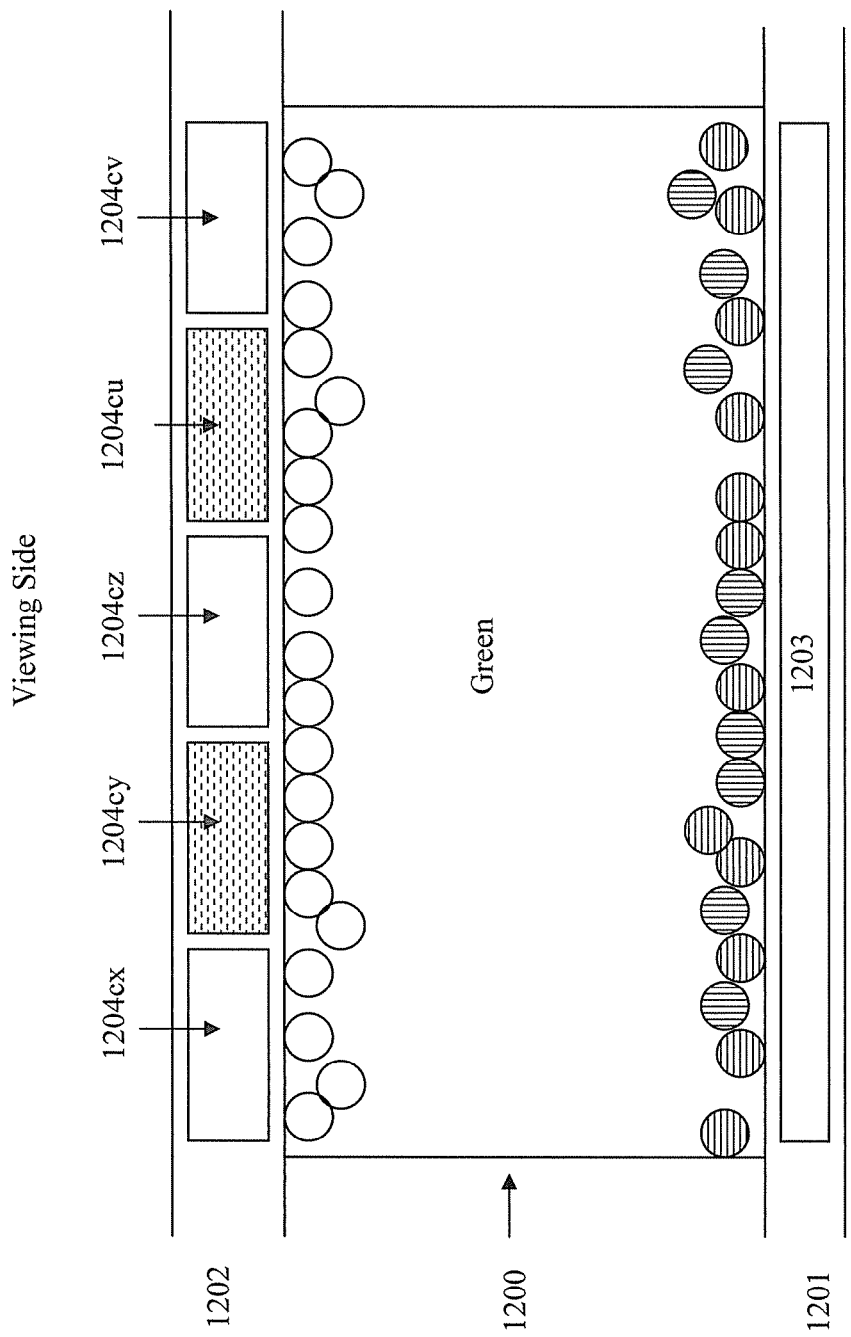

In FIG. 12a, a negative voltage potential is imposed on the driving electrodes (1204s) and a positive voltage potential is imposed on the common electrode (1203). As a result, the positively charged white pigment particles move to be at or near the driving electrodes. A white color therefore is seen from the viewing side.

Figure 12B:
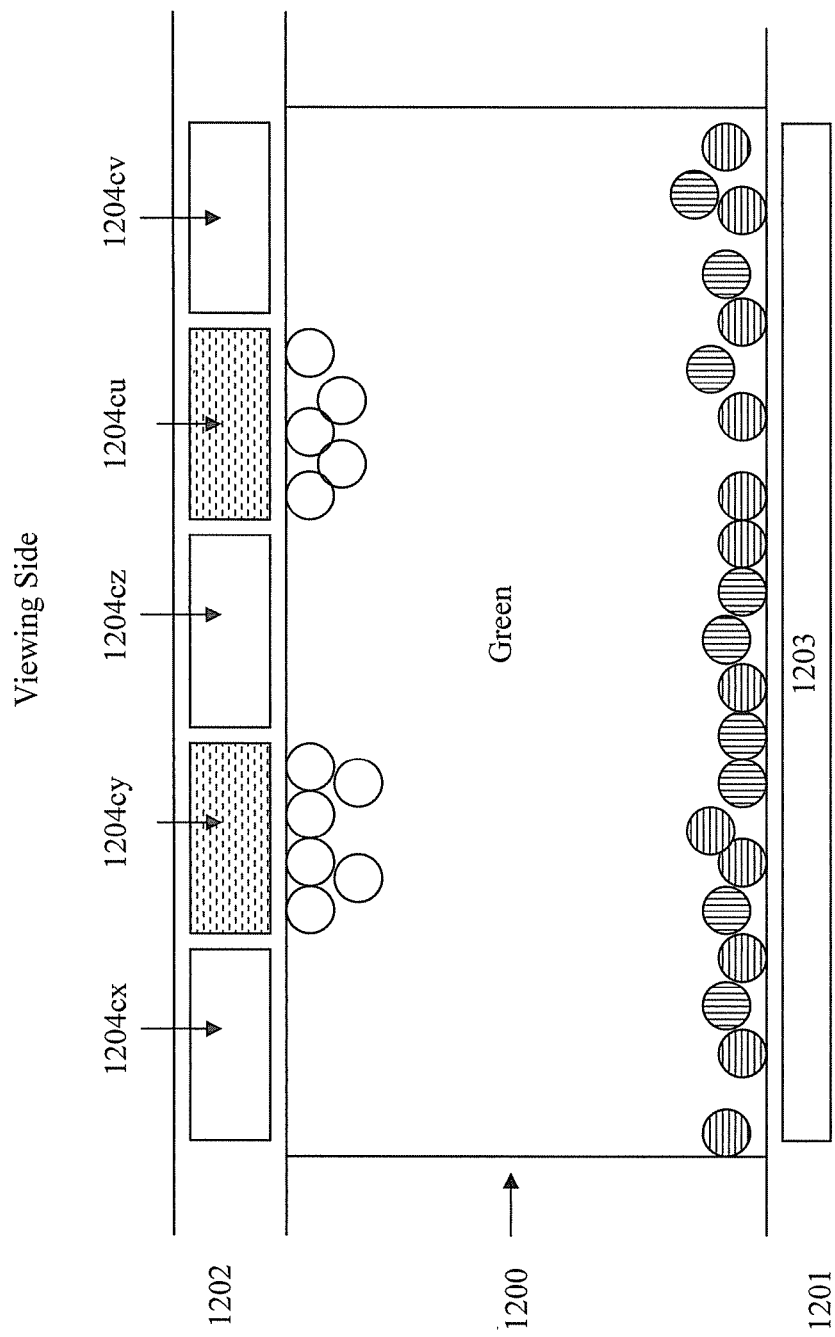

In FIG. 12b, a negative voltage potential is imposed on the designated electrodes 1204cy and 1204cu and a positive voltage potential is imposed on the common electrode (1203). The non-designated driving electrodes (1204cx, 1204cz and 1204cv) are held at ground. As a result, the white particles move to be at or near the designated electrodes while the red and blue particles move to be at or near the common electrodes. Since the solvent is of the green color which does not transmit much red or blue color light reflected back from the red or blue particles, a black color is perceived and seen from the viewing side.

Figure 12C:
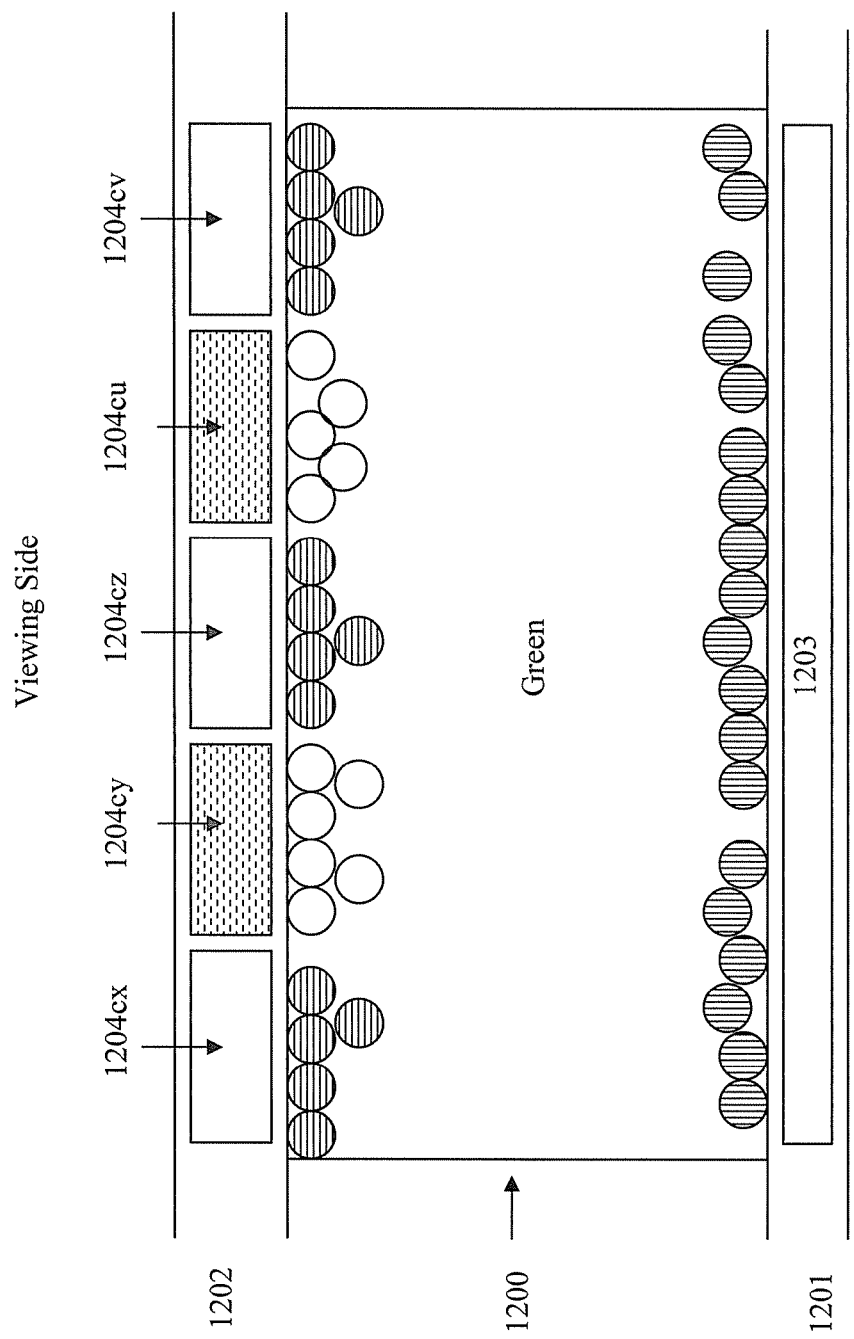

In FIG. 12c, the blue particles move to be at or near the non-designated driving electrodes (1204cx, 1204cz and 1204cv). In this case, a positive voltage potential is first imposed on the non-designated driving electrodes (1204cx, 1204cz and 1204cv) and a negative voltage potential is imposed on the designated driving electrodes (1204cy and 1204cu). The common electrode (1203) is held at ground. As a result, the blue and red pigment particles move to be at or near the non-designated electrodes (1204cx, 1204cz and 1204cv) whereas the positively white particles move to be at or near the designated electrodes (1204cy and 1204cu).

In a second step, a strong positive voltage potential is imposed on the common electrode (1203) while a weaker positive voltage potential is imposed on the non-designated driving electrodes (1204cx, 1204cz and 1204cv). Since the red particles carry a stronger negative polarity than the blue particles, they would move faster to be at or near the common electrode while the blue particles remain at or near the non-designated electrodes. As a result, a blue color is seen from the viewing side.

In FIG. 12d, the red particles move to be at or near the non-designated driving electrodes. In this case, a positive voltage potential is first imposed on the common electrode (1203) and a negative voltage potential is imposed on the designated driving electrodes (1204cy and 1204cu). As a result, the blue and red pigment particles move to be at or near the common electrode (1203) whereas the positively charged white particles move to be at or near the designated electrodes (1204cy and 1204cu).

In a second step, a strong positive voltage potential is imposed on the non-designated electrodes (1204cx, 1204cz and 1204cv) while a weaker positive voltage potential is imposed on the common electrode (1203). Since the blue particles carry a weaker negative polarity than the red particles, they would remain at the common electrode while the red particles move to be at or near the non-designated electrodes (1204cx, 1204cz and 1204cv). As a result, a red color is seen from the viewing side.

Figure 12E:
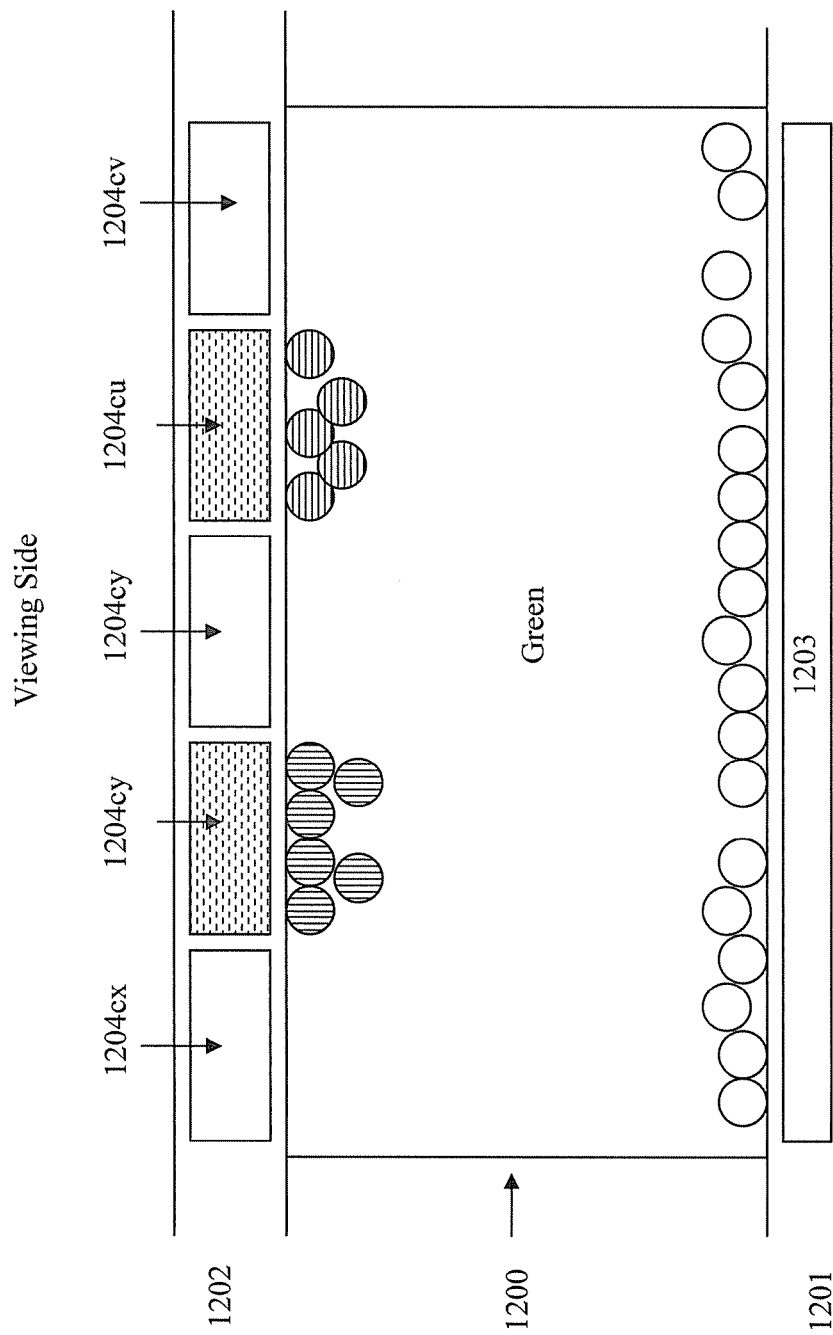

In FIG. 12e, shows the green state from the viewing side by moving the white particles to the common electrode (1203) and the red and blue particles to the designated electrodes (1204cy and 1204cu). Since the red and blue particles are hidden from the viewing side, only the green color is seen from the viewing side.

The three types of particles system can display five color states, namely, white, black, red, green and blue, as shown in FIGS. 12a-12e.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device comprising:
  (i) a plurality of display cells, wherein each of said display cells
    (a) is filled with an electrophoretic fluid comprising at least two different types of pigment particles dispersed in a solvent or solvent mixture, and
    (b) is sandwiched between a first layer comprising a common electrode and a second layer comprising at least one designated driving electrode and at least one non-designated driving electrode, wherein the different types of pigment particles are driven to the common electrode, the at least one designated driving electrode or the at least one non-designated electrode, and
  (ii) at least one blocking layer for each of said display cells, which at least one blocking layer is positioned corresponding to only the at least one designated driving electrode to allow the pigment particles gathered at the at least one designated driving electrode to be hidden and the pigment particles gathered at the at least one non-designated driving electrode to be visible when the display cell is viewed through the first layer, wherein the at least one block layer and the first layer are on a viewing side and the second layer is on a non-viewing side, and the display cell is operable for displaying at least four color states.

2. The display device of claim 1, wherein said blocking layer is a black matrix layer.

3. The display device of claim 2, wherein the width of the black matrix layer is equal to or greater than the width of the designated driving electrode.

4. The display device of claim 1, wherein said blocking layer is a micro-structure or micro-reflector of a brightness enhancement structure.

5. The display device of claim 4, wherein the width of the base of the micro-structure or micro-reflector is equal to or greater than the width of the designated driving electrode.

6. The display device of claim 1, wherein said electrophoretic fluid comprises two types of pigment particles dispersed in a solvent or solvent mixture.

7. The display device of claim 6, wherein the two types of pigment particles carry opposite charge polarities.

8. The display device of claim 6, wherein the two types of pigment particles are of different electrophoretic mobilities.

9. The display device of claim 6, wherein one type of the pigment particles is white and the other type of the pigment particles is red, green or blue.

10. The display device of claim 6, wherein said solvent or solvent mixture is red, green or blue.

11. The display device of claim 6, comprising pixels wherein each pixel comprises two sub-pixels.

12. The display device of claim 6, comprising pixels wherein each pixel comprises three sub-pixels.

13. The display device of claim 6, comprising pixels wherein each pixel comprises four sub-pixels.

14. The display device of claim 1, wherein said electrophoretic fluid comprises three types of pigment particles dispersed in a solvent or solvent mixture.

15. The display device of claim 14, wherein the three types of pigment particles carry different levels of charge polarity.

16. The display device of claim 14, wherein one type of the pigment particles is white and the other two types of the pigment particles are red and green, red and blue or green and blue.

17. The display device of claim 14, wherein said solvent or solvent mixture is red, green or blue.

18. The display device of claim 1, wherein driving electrodes are not aligned with the boundary of the display cell.

19. The display device of claim 1, wherein the pigment particles are driven to the at least designated driving electrode all at once.

20. The display device of claim 1, wherein the pigment particles are driven to the designated driving electrode(s) in steps.

21. The display device of claim 1, wherein said driving electrodes are a grid of at least 2×2.

22. The display device of claim 1, wherein said display cells are microcups.

23. The display device of claim 1, wherein said display cells are microcapsules.

24. The display device of claim 1 wherein there is a black background layer above or below the second layer.

25. The display device of claim 1 wherein the second layer is black.

* * * * *